United States Patent
Ramachandra et al.

(10) Patent No.: US 12,556,994 B2
(45) Date of Patent: Feb. 17, 2026

(54) USER PLANE ASPECTS CONSIDERING DUPLICATE DISCARD FOR DUAL ACTIVE PROTOCOL STACK HANDOVER REPORT

(71) Applicant: Telefonaktiebolaget LM Ericsson (PUBL), Stockholm (SE)

(72) Inventors: Pradeepa Ramachandra, Linköping (SE); Roman Zhohov, Sundbyberg (SE); Marco Belleschi, Solna (SE); Mattias Bergström, Sollentuna (SE); Icaro Leonardo Da Silva, Solna (SE); Angelo Centonza, Torrenueva Costa (ES)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 576 days.

(21) Appl. No.: 18/007,495

(22) PCT Filed: Aug. 5, 2021

(86) PCT No.: PCT/SE2021/050776
§ 371 (c)(1),
(2) Date: Jan. 31, 2023

(87) PCT Pub. No.: WO2022/031213
PCT Pub. Date: Feb. 10, 2022

(65) Prior Publication Data
US 2023/0292205 A1    Sep. 14, 2023

Related U.S. Application Data

(60) Provisional application No. 63/062,337, filed on Aug. 6, 2020.

(51) Int. Cl.
*H04W 36/24* (2009.01)
*H04W 36/00* (2009.01)
*H04W 36/18* (2009.01)

(52) U.S. Cl.
CPC ... *H04W 36/249* (2023.05); *H04W 36/00835* (2018.08); *H04W 36/00837* (2018.08); *H04W 36/185* (2023.05)

(58) Field of Classification Search
CPC ......... H04W 36/249; H04W 36/00835; H04W 36/00837; H04W 36/185; H04W 36/0079; H04W 24/02
(Continued)

(56) References Cited

U.S. PATENT DOCUMENTS

2016/0150455 A1*  5/2016  Suryavanshi ......... H04W 76/45
                                                    455/436

FOREIGN PATENT DOCUMENTS

JP    2012034055 A1   2/2012
WO    2021 086249 A1  5/2021

OTHER PUBLICATIONS

China Telecom (Repporteur). "Summary for WI: Even further mobility enhancement in E-UTRAN". 3GPP TSG RAN #88e RP-200738, Electronic Meeting, Jun. 29-Jul. 3, 2020.
(Continued)

*Primary Examiner* — Marcos Batista
(74) *Attorney, Agent, or Firm* — Baker Botts L.L.P.

(57) ABSTRACT

A method performed by a wireless device includes obtaining User Plane (UP) information comprising at least one Handover (HO) interruption time. The at least one HO interruption time is associated with a first packet of a plurality of duplicate packets received by the wireless device. The wireless device transmits, to a network node, a report associated with a handover of the wireless device, the report comprising the UP information comprising the at least one HO interruption time associated with the first packet of the plurality of duplicate packets received by the wireless device.

21 Claims, 19 Drawing Sheets

(58) Field of Classification Search
USPC .......................................... 370/331; 455/312
See application file for complete search history.

(56) References Cited

OTHER PUBLICATIONS

3GPP TR 36.881 V14.0.0 (Jun. 2016); 3rd Generation Partnership Project; Technical Specification Group Radio Access Network; Evolved Universal Terrestrial Radio Access (E-UTRA); Study on latency reduction techniques for LTE (Release 14) [due to size, this reference has been split into two parts].

3GPP TS 36.331 V14.14.0 (Mar. 2020); 3rd Generation Partnership Project; Technical Specification Group Radio Access Network; Evolved Universal Terrestrial Radio Access (E-UTRA); Radio Resource Control (RRC); Protocol specification (Release 14).

3GPP TS 36.300 V16.2.0 (Jul. 2020); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).

3GPP TS 36.423 V16.2.0 (Jul. 2020); 3rd Generation Partnership Project; Technical Specification Group Radio Access Network; Evolved Universal Terrestrial Radio Access Network (E-UTRAN); X2 application protocol (X2AP) (Release 16).

3GPP TS 38.133 V16.2.0 (Dec. 2019); 3rd Generation Partnership Project; Technical Specification Group Radio Access Network; NR; Requirements for support of radio resource management (Release 16).

3GPP TS 38.300 V16.2.0; 3rd Generation Partnership Project; Technical Specification Group Radio Access Network; NR; NR and NG-RAN Overall Description; Stage 2 (Release 16).

ETSI TS 138 331 V16.1.0 (Jul. 2020); 5G; NR; Radio Resource Control (RRC); Protocol specification (3GPP TS 38.331 version 16.1.0 Release 16).

3GPP TSG-RAN WG2 Meeting #77; Dresden, Germany; Source: Huawei, HiSilicon; Title: Impact of mobility in MDT QoS verification (R2-120152)—Feb. 6-10, 2012.

3GPP TSG-RAN WG2 #107bis; Chongqing, PR China; Source: Ericsson; Title: Successful handover report in NR (Tdoc R2-1913444)—Oct. 14-18, 2019.

3GPP TSG-RAN WG2 Meeting #108; Reno, Nevada; Source: Qualcomm Incorporated; Title: Discussion about Successful HO in MRO (R2-1915055)—Nov. 18-22, 2019.

3GPP TSG-RAN2 Meeting #109-e; Electronic meeting; Change Request; 36.331 CR 4205 Rev 1 Current version: 15.8.0 (R2-2001753)—Feb. 24-Mar. 6, 2020.

3GPP TSG-RAN WG2 #114-e; Electornic meeting; Source: Ericsson; Title: Summary of AI 8.13.2.1 Handover related SON aspects (Tdoc R2-2106637)—May 19-27, 2021.

3GPP TSG-RAN3 Meeting #105bis; Chongqing, China; Change Request; Title: Support of SON; 36.300 CR; Current Version v15.6.0 (R3-195416)—Oct. 14-18, 2019.

3GPP TSG-RAN Meeting #87; Online; Source: RAN2; Title: RAN2 CRs to Even further Mobility enhancement in E-Utran (RP-200364)—Mar. 16-19, 2020.

PCT International Search Report issued for International application No. PCT/SE2021/050776—Nov. 11, 2021.

PCT Written Opinion of the International Searching Authority issued for International application No. PCT/SE2021/050776—Nov. 11, 2021.

CATT (Rapporteur), "Output of Email Discussion [107#45][NRSON] RACH and Mobility Robustness Optimisation Checking", 3GPP TSG-RAN WG2 Meeting #107bis, R2-1912147, Chongqing, P.R. China, Oct. 14-18, 2019.

Huawei, "Successful HO reporting", 3GPP TSG-RAN3 Meeting #104, R3-192961, Reno, Nevada, US, May 13-17, 2019.

* cited by examiner

USER PLANE ASPECTS CONSIDERING DUPLICATE DISCARD FOR DUAL ACTIVE PROTOCOL STACK HANDOVER REPORT

PRIORITY

This nonprovisional application is a U.S. National Stage Filing under 35 U.S.C. § 371 of International Patent Application Serial No. PCT/SE2021/050776 filed Aug. 5, 2021 and entitled "USER PLANE ASPECTS CONSIDERING DUPLICATE DISCARD FOR DUAL ACTIVE PROTOCOL STACK HANDOVER REPORT" which claims priority to U.S. Provisional Patent Application No. 63/062,337 filed Aug. 6, 2020, both of which are hereby incorporated by reference in their entirety.

TECHNICAL FIELD

The present disclosure relates, in general, to wireless communications and, more particularly, systems and methods relating to user plane aspects considering duplicate discard for Dual Active Protocol Stack (DAPS) handover report.

BACKGROUND

A simplified 3$^{rd}$ Generation Partnership Project (3GPP) wireless communication system is illustrated in FIG. 1 and includes a user equipment (UE), which communicates with one or multiple access nodes, which in turn is connected to a network node. The access nodes are part of the radio access network.

For wireless communication systems pursuant to 3GPP Evolved Packet System (EPS) (also referred to as Long Term Evolution (LTE) or 4th Generation (4G)) standard specifications, such as specified in 3GPP TS 36.300 v.16.2.0 and related specifications, the access nodes corresponds typically to an Evolved NodeB (eNB) and the network node corresponds typically to either a Mobility Management Entity (MME) and/or a Serving Gateway (SGW). The eNB is part of the radio access network, which in this case is the Evolved Universal Terrestrial Radio Access Network (E-UTRAN), while the MME and SGW are both part of the Evolved Packet Core network (EPC). The eNBs are interconnected via the X2 interface, and connected to EPC via the S1 interface, more specifically via S1-C to the MME and S1-U to the SGW.

For wireless communication systems pursuant to 3GPP 5G System (5GS) (also referred to as New Radio (NR) or 5th Generation (5G)) standard specifications, such as specified in 3GPP TS 38.300 v.16.2.0 and related specifications, on the other hand, the access nodes corresponds typically to an 5G NodeB (gNB) and the network node corresponds typically to either a Access and Mobility Management Function (AMF) and/or a User Plane Function (UPF). The gNB is part of the radio access network, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid change of core network, LTE eNBs can also be connected to the 5GC via NG-U/NG-C and support the Xn interface. An eNB connected to 5GC is called a next generation eNB (ng-eNB) and is considered part of the Next Generation-Radio Access Network (NG-RAN). LTE connected to 5GC will not be discussed further in this document; however, it should be noted that most of the solutions/features described for LTE and NR in this document also apply to LTE connected to 5GC. As used herein, the term LTE is used without further specification to refer to LTE-EPC.

Mobility in RRC_CONNECTED in LTE and NR

Mobility in RRC_CONNECTED state is also known as handover. The purpose of handover is to move the UE, due to for example, mobility, from a source access node using a source radio connection (also known as source cell connection), to a target access node, using a target radio connection (also known as target cell connection). The source radio connection is associated with a source cell controlled by the source access node. The target radio connection is associated with a target cell controlled by the target access node. So in other words, during a handover, the UE moves from the source cell to a target cell. Sometimes the source access node or the source cell is referred to as the "source", and the target access node or the target cell is sometimes referred to as the "target".

In some cases, the source access node and target access node are different nodes, such as different eNBs or gNBs. These cases are also referred to as inter-node handover, inter-eNB handover or inter-gNB handover. In other cases, the source access node and target access node are the same node, such as the same eNB and gNB. These cases are also referred to as intra-node handover, intra-eNB handover or intra-gNB handover and covers the case then source and target cells are controlled by the same access node. In yet other cases, handover is performed within the same cell (and thus also within the same access node controlling that cell)—these cases are also referred to as intra-cell handover.

It should therefore be understood that the source access node and target access node refers to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

An RRC_CONNECTED UE in E-UTRAN or NG-RAN can be configured by the network to perform measurements of serving and neighbor cells and based on the measurement reports sent by the UE, the network may decide to perform a handover of the UE to a neighbor cell. The network then sends a Handover Command message to the UE. In LTE, this message is an RRConnectionReconfiguration message with a field called mobilityControlInfo. In NR, this message is an RRCReconfiguration message with a reconfigurationWithSync field.

These reconfigurations are actually prepared by the target access node upon a request from the source access node (over X2 or S1 interface in case of EUTRA-EPC or Xn or NG interface in case of NG-RAN-5GC) and takes into account the existing RRC configuration and UE capabilities as provided in the request from the source access node and its own capabilities and resource situation in the intended target cell and target access node. The reconfiguration parameters provided by the target access node contains, for example, information needed by the UE to access the target access node such as, for example, random access configuration, a new C-RNTI assigned by the target access node and security parameters enabling the UE to calculate new security keys associated to the target access node so the UE can send a Handover Complete message (in LTE an RRConnectionReconfiguratioComplete message and in NR an RRCReconfigurationComplete message) on SRB1 encrypted and integrity protected based on new security keys upon accessing the target access node.

FIG. 2 illustrates the signaling flow between UE, source access node (also known as source gNB, source eNB or source cell) and target access node (also known as target gNB, target eNB or target cell) during a handover procedure, using LTE as example.

Specifically, at step 1, a measurement report is sent from the UE to the source eNB. Thereafter, user data is exchanged between the UE and the source eNB and the source eNB and the SGW. At step 2, the source eNB performs a handover (HO) decision. At step 3, the source eNB sends a handover request to the target eNB. At step 4, the target eNB sends a HO request acknowledgement to the source eNB. At step 5, the source eNB sends a RCC connection reconfiguration message to the UE. At step 6, the UE detaches from the source cell. At step 7, the source eNB sends a SN status transfer message to the target eNB. Thereafter data is forwarded from the source eNB to the target eNB. At step 8, random access is performed between the UE and the target eNB. At step 9, a RRC connection reconfiguration complete message is transmitted from the UE to the target eNB. Thereafter, user data is exchanged between the UE and the target eNB. At step 10, the target eNB sends the MME a path switch request. At step 11, the MME and the SGW exchange path switch related signaling. Thereafter, user data is exchanged between the target eNB and the SGW, and the SGW sends an end marker to the target eNB, which then forwards it to the source eNB, which then returns it to the target eNB. At step 12, the target eNB sends a path switch request acknowledgement to the MME. The target eNB then transmits a UE context release message to the source eNB, at step 13.

Depending on the required Quality of Service (QoS), either a seamless or a lossless handover is performed as appropriate for each user plane radio bearer, as explained in the following subsections.

Seamless Handover

Seamless handover is applied for user plane radio bearers mapped on Radio Link Control (RLC) Unacknowledged Mode (UM). These types of data are typically reasonably tolerant of losses but less tolerant of delay (e.g. voice services). Seamless handover is therefore designed to minimize complexity and delay but may result in loss of some Packet Data Convergence Protocol (PDCP) Service Data Units (SDUs).

At handover, for radio bearers to which seamless handover applies, the PDCP entities including the header compression contexts are reset, and the COUNT values are set to zero. As a new key is anyway generated at handover, there is no security reason to maintain the COUNT values. PDCP SDUs in the UE for which the transmission has not yet started will be transmitted after handover to the target access node. In the source access node, PDCP SDUs that have not yet been transmitted can be forwarded via the X2/Xn interface to the target access node. PDCP SDUs for which the transmission has already started but that have not been successfully received will be lost. This minimizes the complexity because no context (i.e. configuration information) has to be transferred between the source access node and the target access node at handover.

Lossless Handover

Based on the sequence number (SN) that is added to PDCP Data Packet Data Units (PDUs), it is possible to ensure in-sequence delivery during handover, and even provide a fully lossless handover functionality, performing retransmission of PDCP SDUs for which reception has not yet been acknowledged prior to the handover. This lossless handover function is used mainly for delay-tolerant services such as file downloads where the loss of one PDCP SDU can result in a drastic reduction in the data rate due to the reaction of the Transmission Control Protocol (TCP).

Lossless handover is applied for user plane radio bearers that are mapped on RLC Acknowledged Mode (AM). When RLC AM is used, PDCP SDUs that have been transmitted but not yet been acknowledged by the RLC layer are stored in a retransmission buffer in the PDCP layer.

In order to ensure lossless handover in the downlink (DL), the source access node forwards the DL PDCP SDUs stored in the retransmission buffer as well as fresh DL PDCP SDUs received from the gateway to the target access node for (re-)transmission. The source access node receives an indication from the core network gateway (SGW in LTE/EPC, UPF in LTE/5GC and NR) that indicates the last packet sent to the source access node (a so called "end marker" packet). The source access node also forwards this indication to the target access node so that the target access node knows when it can start transmission of packets received directly from the gateway.

In order to ensure lossless handover in the uplink (UL), the UE retransmits the UL PDPC SDUs that are stored in the PDCP retransmission buffer in the target access node. The retransmission is triggered by the PDCP re-establishment that is performed upon reception of the handover command. The source access node, after decryption and decompression, will forward all PDCP SDUs received out of sequence to the target access node. Thus, the target access node can reorder the PDCP SDUs received from the source access node and the retransmitted PDCP SDUs received from the UE based on the PDCP SNs which are maintained during the handover, and deliver them to the gateway in the correct sequence.

An additional feature of lossless handover is so-called selective retransmission. In some cases it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to avoid these unnecessary retransmissions, a PDCP status report can be sent from the target access node to the UE and from the UE to the target access node. Whether to send a PDCP status report after handover is configured independently for each radio bearer and for each direction.

Rel-14 Make-Before-Break Handover

Handover interruption time is typically defined as the time from the UE stops transmission/reception with the source access node until the target access node resumes transmission/reception with the UE.

In LTE pre-Rel-14, according to 3GPP TR 36.881 v.14.0.0, the handover interruption time is at least 45 ms. In LTE and NR, different solutions to decrease the handover interruption time have since then been discussed. Improvements are driven for example by new service requirements on low latency (e.g. aerial, industrial automation, industrial control) for which low interruption time shall be guaranteed.

As an example of one such improvement, Make-Before-Break (MBB) was introduced in LTE Rel-14 in purpose to shorten handover interruption time as close to 0 ms as possible. FIG. 3 illustrates example signaling according to the Release-14 LTE MBB.

Specifically, at step 1, a measurement report is sent from the UE to the source eNB. Thereafter, user data is exchanged between the UE and the source eNB and the source eNB and the SGW. At step 2, the source eNB performs a handover (HO) decision. At step 3, the source eNB sends a handover request to the target eNB. At step 4, the target eNB sends a HO request acknowledgement to the source eNB. At step 5, the source eNB sends a RCC connection reconfiguration message to the UE. Thereafter user data is exchanged between the UE and the source eNB and the source eNB and the SGW. At step 6, the UE detaches from the source cell. At step 7, the source eNB sends a SN status transfer message to the target eNB. Thereafter data is forwarded from the source eNB to the target eNB. At step 8, random access is performed between the UE and the target eNB. At step 9, a RRC connection reconfiguration complete message is transmitted from the UE to the target eNB. Thereafter, user data is exchanged between the UE and the target eNB. At step 10, the target eNB sends the MME a path switch request. At step 11, the MME and the SGW exchange path switch related signaling. Thereafter, user data is exchanged between the target eNB and the SGW, and the SGW sends an end marker to the target eNB, which then forwards it to the source eNB, which then returns it to the target eNB. At step 12, the target eNB sends a path switch request acknowledgement to the MME. The target eNB then transmits a UE context release message to the source eNB, at step 13.

The MBB handover procedure as introduced in LTE Rel-14, refers to a handover mechanism where the UE connects to the target cell before disconnecting from the source cell unlike the standard handover procedure where the UE resets MAC and re-establishes RLC and PDCP upon receiving the Handover Command message (RRCConnectionReconfiguration message with mobilityControlInfo) in the source cell. The mobilityControlInfo in the RRCConnectionReconfiguration message includes a field makeBeforeBreak, to instruct the UE to keep the connection to the source cell.

In the MBB solution, the connection to the source cell is maintained after the reception of Handover Command until the UE executes initial uplink (UL) transmission in the target cell, i.e. Medium Access Control (MAC) reset and RLC and PDCP re-establishment is delayed in the UE until the UE performs random-access in the target cell or, if MBB is combined with RACH-less handover (i.e. rach-Skip is present in the mobilityControlInfo), until the UE performs the initial PUSCH transmission. It is up to UE implementation (and UE capabilities) when to stop the UL transmission/DL reception with the source cell to initiate re-tuning for connection to the target cell.

At the point when the source eNB has stopped transmission/reception to/from the UE, the source eNB sends the SN STATUS TRANSFER message (step 8 in FIG. 3) to the target eNB to convey the uplink PDCP SN receiver status and the downlink PDCP SN transmitter status of the radio bearers for which PDCP status preservation applies.

MBB as specified in LTE Rel-14 (3GPP TS 36.300 v.14.12.0 and TS 36.331 v.14.14.0) has some known limitations. For example, even if MBB and other improvements, such as RACH-less handover are combined it is still not possible to reach ~0 ms handover interruption time. MBB in Rel-14 is only supported for intra-frequency handovers and assumes the UE is equipped with a single Receiver (Rx)/Transmitter (Tx) chain. In an intra-frequency handover scenario, a single Rx UE is capable of receiving from both target and source cell simultaneously, however, a single Tx UE will not be able to transmit to both cells simultaneously. Thus, in MBB Rel-14, the UE will release the connection to the source cell before the first UL transmission. This occurs when the UE transmits the RACH preamble; or transmits the Handover Complete message (if RACH-less Handover (HO) is configured).

Consequently, the UE releases the connection with the source cell before the connection with the target cell is ready for packet transmission/reception which results in interruption time of ~5 ms.

Rel-16 Dual Active Protocol Stacks (DAPS) Handover

To address the shortcomings of Rel-14 MBB and achieve ~0 ms interruption time an enhanced version of Make-Before-Break (MBB), also known as Dual Active Protocol Stacks (DAPS) handover, is being specified for Rel-16 both for LTE and NR.

A DAPS Handover is defined as a handover procedure wherein the UE maintains the source gNB connection after reception of RRC message for handover (i.e., an RRCReconfiguration with a reconfigurationWithSync for the Master Cell Group (MCG)) and until releasing the source cell after successful random access to the target gNB.

During DAPS handover it is assumed that the UE is capable of simultaneously transmitting and receiving from the source and target cells. In practice, this may require that the UE is equipped with dual Tx/Rx chains. The dual Tx/Rx chains potentially also allows DAPS handover to be supported in other handover scenarios such as inter-frequency handover.

FIG. 4 illustrates an example of a DAPS inter-node handover for the case of LTE. Specifically, at step 1, a measurement report is sent from the UE to the source eNB. Thereafter, user data is exchanged between the UE and the source eNB and the source eNB and the SGW. At step 2, the source eNB performs a handover (HO) decision. At step 3, the source eNB sends a handover request to the target eNB. At step 4, the target eNB sends a HO request acknowledgement to the source eNB. At step 5, the source eNB sends a RCC connection reconfiguration message to the UE. At step 6, the source eNB sends a SN status transfer message to the target eNB. Thereafter data is forwarded from the source eNB to the target eNB and user data is exchanged between the UE and the source eNB and the source eNB and the target eNB. At step 7, random access is performed between the UE and the target eNB. At step 8, a RRC connection reconfiguration complete message is transmitted from the UE to the target eNB. Thereafter, user data is exchanged between the UE and the target eNB. At step 9, the target eNB sends the MME a path switch request. At step 10, the MME and the SGW exchange path switch related signaling. Thereafter, user data is exchanged between the target eNB and the SGW, and the SGW sends an end marker to the target eNB, which then forwards it to the source eNB, which then returns it to the target eNB. At step 11, the MME sends a path switch request acknowledgement to the target eNB. The target eNB then transmits a UE context release message to the source eNB, at step 12. At step 13, the UE releases the source cell.

It may be noted that, in step 5, upon receiving the "DAPS HO" indication in the Handover Command (set per bearer), e.g. an RRCReconfiguration with a reconfigurationWithSync for the MCG, the UE maintains the connection to the source cell associated to a source access node while establishing the connection to the target cell associated to a target access node (for the bearers configured with DAPS). That is, the UE can send and receive DL/UL user plane data via the source access node between step 5-8 without any interruption for the respective bearers. And after step 8, the UE has the target link available for UL/DL user plane data transmission similar to the regular HO procedure.

DAPS configuration for a given bearer is provided as part of the RadioBearerConfig, for each DRB to be configured with DAPS, as described in TS 38.331 v.16.1.0 wherein the RadioBearerConfig IE is included in the RRCReconfiguration with a reconfigurationWithSync for the MCG.

In case of DAPS handover, the UE continues the downlink user data reception from the source gNB until releasing the source cell, i.e. daps-SourceRelease message transmitted by the target, and continues the uplink user data transmission to the source gNB until successful random access procedure to the target gNB. In order to do that, the UE should keep performing radio link monitoring (RLM) with respect to the source cell for the whole duration of the handover, i.e. until RRCReconfigurationComplete containing HO completion information is transmitted. That implies for example that the UE should keep monitoring possible out-of-sync indications, whether the RLC retransmissions with the source exceed the threshold, etc. Obviously, in case RLF occurs in the source cell while performing DAPS, the UE releases the source connection, but it can continue the DAPS HO to the target.

As previously discussed, the UE configured with DAPS HO can continue with UL transmissions towards the source cell until the handover is completed in the target, i.e. RRCReconfigurationComplete is transmitted to the target. For the DL instead, the source network node (e.g. a source gNodeB) can keep sending DL data until the source configuration release, conveyed in the daps-SourceRelease message transmitted by the target (after having received the RRCReconfigurationComplete) is received by the UE. Hence, even though UL data transmission to the source cell will not be prolonged beyond the handover completion, some UL transmissions to the source cell should be performed towards the source cell after the handover completion, such as Hybrid Automatic Repeat Request (HARQ) Acknowledgement (ACK)/Negative Acknowledgement (NACK) and other possible layer-1 control signaling.

The handover mechanism triggered by RRC requires the UE at least to reset the MAC entity and re-establish RLC, except for DAPS handover, where upon reception of the handover command, the UE:

Creates a MAC entity for target (i.e. a different/new MAC entity);
Establishes the RLC entity and an associated Dedicated Traffic Channel (DTCH) logical channel for target for each Data Radio Bearer (DRB) configured with DAPS;
For the DRB configured with DAPS, reconfigures the PDCP entity with separate security and Robust Header Compression (ROHC) functions for source and target and associates them with the RLC entities configured by source and target respectively;
Retains the rest of the source configurations until release of the source.

For DRBs configured with DAPS, the source gNB does not stop transmitting downlink packets until it receives the HANDOVER SUCCESS message from the target gNB. In RRC, UE actions are defined Sections 5.3.5.5.2, 5.3.5.5.4, and 5.3.5.5.5 in 3GPP TS 38.331 v.16.1.0.

For DRBs configured with DAPS, downlink PDCP SDUs are forwarded with Sequence Number (SN) assigned by the source node (gNB), until SN assignment is handed over to the target gNB (which only happens later in the execution procedure).

In step 6 of FIG. 4, the source access node sends an SN status transfer message to the target access node, indicating UL PDCP receiver status and the SN of the first forwarded DL PDCP SDU. The uplink PDCP SN receiver status includes at least the PDCP SN of the first missing UL SDU and may include a bit map of the receive status of the out of sequence UL SDUs that the UE needs to retransmit in the target cell, if there are any such SDUs. The SN Status Transfer message also contains the Hyper Frame Number (HFN) of the first missing UL SDU as well as the HFN DL status for COUNT preservation in the target access node. In other words, for DRBs configured with DAPS, the source access node (or simply source gNB) first sends the EARLY STATUS TRANSFER message. The DL COUNT value conveyed in the EARLY STATUS TRANSFER message indicates PDCP SN and HFN of the first PDCP SDU that the source gNB forwards to the target gNB. The source gNB does not stop assigning SNs to downlink PDCP SDUs until it sends the SN STATUS TRANSFER message to the target gNB in step 8*b*.

Once the connection setup with the target access node is successful, i.e. after sending the Handover Complete message in step 8 of FIG. 4, the UE maintains two data links, one to the source access node and one to the target access node (except in the UL where the UE only uses the target after successful random access). After step 8 of FIG. 4, the UE transmits the UL user plane data on the target access node similar to the regular HO procedure using the target access node security keys and compression context. Thus, there is no need for simultaneous UL user data transmission to both nodes which avoids UE power splitting between two nodes and also simplifies UE implementation. In the case of intra-frequency handover, transmitting UL user plane data to one node at a time also reduces UL interference which increases the chance of successful decoding at the network side.

The UE needs to maintain the security and compression context for both source access node and target access node until the source link is released. The UE can differentiate the security/compression context to be used for a PDCP PDU based on the cell which the PDU is transmitted on.

To avoid packet duplication, the UE may send a PDCP status report together with the Handover Complete message in step 8 of FIG. 4, indicating the last received PDCP SN. Based on the PDCP status report, the target access node can avoid sending duplicate PDCP packets (i.e. PDCP PDUs with identical sequence numbers) to the UE, i.e. PDCP packets which were already received by the UE in the source cell.

The release of the source cell in step 13 of FIG. 4 can, for example, be triggered by an explicit message from the target access node (not shown in the figure) or by some other event such as the expiry of a release timer.

As an alternative to source access node starting packet data forwarding after step 5 of FIG. 4 (i.e. after sending the Handover Command to the UE, also known as "early packet forwarding"), the target access node may indicate to the source access node when to start packet data forwarding. For instance, the packet data forwarding may start at a later stage when the link to the target cell has been established, e.g. after the UE has performed random access in the target cell or when the UE has sent the RRC Connection Reconfiguration Complete message to the target access node (also known as "late packet forwarding"). By starting the packet data forwarding in the source access node at a later stage, the number of duplicated PDCP SDUs received by the UE from the target cell will potentially be less and by that the DL latency will be somewhat reduced. However, starting the packet data forwarding at a later stage is also a trade-off between robustness and reduced latency if, for example, the connection between the UE and the source access node is lost before the connection to the target access node is established. In such case there will be a short interruption in the DL data transfer to the UE. FIG. 5 illustrates the protocol stack at the UE side at Dual Active Protocol Stack (DAPS) handover.

FIG. 5 illustrates the protocol stack at the UE side at DAPS handover.

Each user plane radio bearer has an associated PDCP entity which in turn has two associated RLC entities, two associated MAC, and two associated PHY—one each for the source cell and one each for the target cell. The PDCP entity uses different security keys and ROHC contexts for the source and target cell while the SN allocation (for UL transmission) and re-ordering/duplication detection (for DL reception) is common. The PDCP entity performs SN allocation for UL and re-ordering duplication detection for DL.

Note that in case of NR, there is an additional protocol layer called Service Data Adaptation Protocol (SDAP) on top of PDCP which is responsible for mapping QoS flows to bearers. This layer is not shown in FIG. 5 and will not be further discussed herein.

DAPS Handover Failure

Timer based handover failure procedure is supported in NR (i.e., UE starts timer T304 when receives the RRCReconfiguration with reconfiguration with sync, and stops the timer when successful, and upon expiry declares handover failure). RRC connection re-establishment procedure is used for recovering from handover failure. However, when DAPS HO fails, the UE has the possibility to fall back to source cell configuration, resumes the connection with source cell, and reports DAPS HO failure via the source without triggering RRC connection re-establishment if the source link has not been released. Obviously, such fallback to the source cell can only occur in case RLF with respect to the source cell has not been declared yet at the time the T304 expires. Once the UE has fell back to the source cell, it issues a failure information to indicate to the source cell that the UE failed the DAPS HO towards the target.

Otherwise, if RLF with respect to the source cell has already occurred at the time the DAPS handover to the target fails, i.e. T304 expires, the UE selects a third cell different from the source and the target for reestablishment. This feature is discussed in Section 5.3.5.8.3 and Section 5.7.5 of 3GPP TS 38.331 v16.1.0.

Self-Organising Networks (SON) in 3GPP

A Self-Organizing Network (SON) is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks).

In 3GPP, the processes within the SON area are classified into Self-configuration process and Self-optimization process. Self-configuration process is the process where newly deployed nodes are configured by automatic installation procedures to get the necessary basic configuration for system operation.

This process works in pre-operational state. Pre-operational state is understood as the state from when the eNB is powered up and has backbone connectivity until the RF transmitter is switched on.

FIG. 6 illustrates the ramifications of Self-Configuration/Self-Optimization functionality as disclosed in 3GPP TS 36.300 v.16.2.0. Specifically, as illustrated in FIG. 6, functions handled in the pre-operational state like:

Basic Setup; and
Initial Radio Configuration.
are covered by the Self Configuration process.

Self-optimization process is defined as the process where UE and access node measurements and performance measurements are used to auto-tune the network.

This process works in operational state. Operational state is understood as the state where the RF interface is additionally switched on.

As described in FIG. 6, functions handled in the operational state like:

Optimization/Adaptation
are covered by the Self Optimization process.

In LTE, support for Self-Configuration and Self-Optimisation is specified, as described in 3GPP TS 36.300 v.16.2.0 Section 22.2, including features such as Dynamic configuration, Automatic Neighbour Relation (ANR), Mobility load balancing, Mobility Robustness Optimization (MRO), RACH optimization and support for energy saving.

In NR, support for Self-Configuration and Self-Optimisation is specified as well, starting with Self-Configuration features such as Dynamic configuration, Automatic Neighbour Relation (ANR) in Rel-15, as described in 3GPP TS 38.300 v.16.2.0 section 15. In NR Rel-16, more SON features are being specified for, including Self-Optimisation features such as Mobility Robustness Optimization (MRO).

Mobility Robustness Optimization (MRO) in 3GPP

Seamless handovers are a key feature of 3GPP technologies. Successful handovers ensure that the UE moves around in the coverage area of different cells without causing too much interruptions in the data transmission. However, there will be scenarios when the network fails to handover the UE to the 'correct' neighbor cell in time and in such scenarios the UE will declare the radio link failure (RLF) or Handover Failure (HOF).

Upon HOF and RLF, the UE may take autonomous actions such as, for example, trying to select a cell and initiate reestablishment procedure so that we make sure the UE is trying to get back as soon as it can so that it can be reachable again. The RLF will cause a poor user experience as the RLF is declared by the UE only when it realizes that there is no reliable communication channel (radio link) available between itself and the network. Also, reestablishing the connection requires signaling with the newly selected cell (random access procedure, RRC Reestablishment Request, RRC Reestablishment RRC Reestablishment Complete, RRC Reconfiguration and RRC Reconfiguration Complete) and adds some latency, until the UE can exchange data with the network again.

According to at least 3GPP TS 36.331 v.16.1.0, the possible causes for the radio link failure could be one of the following:

1) Expiry of the radio link monitoring related timer T310;
2) Expiry of the measurement reporting associated timer T312 (not receiving the handover command from the network within this timer's duration despite sending the measurement report when T310 was running);
3) Upon reaching the maximum number of RLC retransmissions;
4) Upon receiving random access problem indication from the MAC entity.

As RLF leads to reestablishment which degrades performance and user experience, it is in the interest of the network to understand the reasons for RLF and try to optimize mobility related parameters (e.g. trigger conditions of measurement reports) to avoid later RLFs. Before the standardization of MRO related report handling in the network, only the UE was aware of some information associated to how did the radio quality looked like at the time of RLF, what is the actual reason for declaring RLF etc. For the network to identify the reason for the RLF, the network needs more information, both from the UE and also from the neighboring base stations.

As part of the MRO solution in LTE, the RLF reporting procedure was introduced in the RRC specification in Rel-9 RAN2 work. That has impacted the RRC specifications in the sense that it was standardized that the UE would log relevant information at the moment of an RLF and later report to a target cell the UE succeeds to connect (e.g. after reestablishment). That has also impacted the inter-gNodeB interface, i.e., X2AP specifications, as an eNodeB receiving an RLF report could forward to the eNodeB where the failure has been originated.

For the RLF report generated by the UE, its contents have been enhanced with more details in the subsequent releases. The measurements included in the measurement report based on 3GPP TS 36.331 v. 16.1.0 are:

1) Measurement quantities (RSRP, RSRQ) of the last serving cell (PCell).
2) Measurement quantities of the neighbor cells in different frequencies of different RATs (EUTRA, UTRA, GERAN, CDMA2000).
3) Measurement quantity (RSSI) associated to WLAN Aps.
4) Measurement quantity (RSSI) associated to Bluetooth beacons.
5) Location information, if available (including location coordinates and velocity)
6) Globally unique identity of the last serving cell, if available, otherwise the PCI and the carrier frequency of the last serving cell.
7) Tracking area code of the PCell.
8) Time elapsed since the last reception of the 'landover command' message.
9) C-RNTI used in the previous serving cell.
10) Whether or not the UE was configured with a DRB having QCI value of 1.

The detection and logging of the RLF related parameters is captured in section 5.3.11.3 of LTE RRC specification 3GPP TS 36.331 v.16.1.0.

After the RLF is declared, the RLF report is logged and, once the UE selects a cell and succeeds with a reestablishment, it includes an indication that it has an RLF report available in the RRC Reestablishment Complete message, to make the target cell aware of that availability. Then, upon receiving an UEInformationRe quest message with a flag "rlf-ReportReq-r9" the UE shall include the RLF report (stored in a UE variable VarRLF-Report, as described above) in an UEInformationResponse message and send to the network.

Based on the RLF report from the UE and the knowledge about which cell did the UE reestablished itself, the original source cell can deduce whether the RLF was caused due to a coverage hole or due to handover associated parameter configurations. If the RLF was deemed to be due to handover associated parameter configurations, the original serving cell can further classify the handover related failure as too-early, too-late or handover to wrong cell classes. These handover failure classes are explained in brief below.

For example, whether the handover failure occurred due to the 'too-late handover' cases, the original serving cell can classify a handover failure to be 'too late handover' when the original serving cell fails to send the handover command to the UE associated to a handover towards a particular target cell and if the UE reestablishes itself in this target cell post RLF. An example corrective action from the original serving cell could be to initiate the handover procedure towards this target cell a bit earlier by decreasing the CIO (cell individual offset) towards the target cell that controls when the IE sends the event triggered measurement report that leads to taking the handover decision.

However, the original serving cell can classify a handover failure to be 'too early handover' when the original serving cell is successful in sending the handover command to the UE associated to a handover however the UE fails to perform the random access towards this target cell. An example corrective action from the original serving cell could be to initiate the handover procedure towards this target cell a bit later by increasing the CIO (cell individual offset) towards the target cell that controls when the IE sends the event triggered measurement report that leads to taking the handover decision.

As another example, the original serving cell can classify a handover failure to be 'handover-to-wrong-cell' when the original serving cell intends to perform the handover for this UE towards a particular target cell but the UE declares the RLF and reestablishes itself in a third cell. A corrective action from the original serving cell could be to initiate the measurement reporting procedure that leads to handover towards the target cell a bit later by decreasing the CIO (cell individual offset) towards the target cell or via initiating the handover towards the cell in which the UE reestablished a bit earlier by increasing the CIO towards the reestablishment cell.

Two different types of inter-node messages have been standardized in LTE for that purpose, the Radio link failure indication and the handover report. See, 3GPP TS 36.423 v.16.2.0.

The Radio link failure indication procedure is used to transfer information regarding RRC re-establishment attempts or received RLF reports between eNBs. This message is sent from the eNB in which the UE performs reestablishment to the eNB which was the previous serving cell of the UE. The contents of the RLF indication message is given below.

Certain problems exist, however. For example, DAPS HO is expected to benefit the user plane performances during the handover. In fact, unlike the ordinary handover, the UE configured with DAPS HO can continue with UL transmissions towards the source cell until the handover is completed in the target, i.e. RRCReconfigurationComplete is transmitted to the target. The source network node (e.g. a source gNodeB) can keep sending DL data until the source configuration release, conveyed in the daps-SourceRelease message by the target after having received the RRCReconfigurationComplete, is received by the UE. However, the above benefit may come in some cases at the expenses of additional amount of duplicate packets being transmitted by the network. That is because when a DAPS HO is triggered, the source can keep scheduling DL data, but those data may not be correctly received by the UE since the UE is moving towards the target cell, and the radio conditions with respect to source cell might not be good enough at that point. Therefore, even if the source cell can keep scheduling DL data after the HO command, it may need anyhow to initiate for those packets (that will be transmitted in the source cell) also the data forwarding procedure over the X2/Xn towards the target cell. Hence, depending on how long the source configuration is kept, the UE may receive a significant amount of duplicates that need to be processed to be later discarded, which may affect the overall experienced delays.

Also, as these packets would be anyway discarded, one could see that as a wasted usage of resources in the source node, which may even lead to interference for other UEs. Moreover, the packets transmitted by the source cell may be subject to "higher-than-usual" losses, given that packets may be transmitted for the whole handover duration and even after HO completion, while very likely the radio conditions with respect to the source may be degrading. Notice that even if the source may schedule packets to the UE, it does not have to, as it may depend on the DL traffic demands. Related to this, it may also be highlighted that the transmitted DL packets need to be acknowledged by the UE, i.e. HARQ ACK/NACK need to be transmitted, and also possible L1 control signaling such as Channel State Information (CSI) including Channel Quality Indicator (CQI), Precoding Matrix Indicator (PMI), etc. However, such UL transmissions, that are needed to the source cell for the sake of the link adaptation may not be received, due to possible collisions with scheduled UL data transmissions by the target cell. In case collisions occur, the UE which is not capable of performing both UL transmissions due to transmission capability limitations, has to prioritize UL transmissions on the target.

The current SON report framework (e.g. the RLF report or any other type of report such as the HO success report or failure information message report) does not provide any information related to the user plane performances, neither related to the DAPS HO, nor related to the ordinary handover. Without such piece of information, the problem is twofold. First, the network is not capable to determine the impacts on user plane performances of DAPS HO and thus evaluate whether the DAPS HO is bringing benefits or not to the system, e.g. when DAPS HO is configured for UEs moving between certain cells. Second, the network is not capable to determine the impacts on user plane performances of the ordinary HO and thus evaluate whether it is beneficial or not to configure DAPS HO rather than an ordinary HO for UEs that are moving between certain cells.

SUMMARY

Certain aspects of the present disclosure and their embodiments may provide solutions to these or other challenges. For example, according to certain embodiments, methods and systems by the wireless device are provided for reporting User Plane (UP) related information in a successful handover report.

According to certain embodiments, a method performed by a wireless device includes obtaining UP information comprising at least one Handover (HO) interruption time. The at least one HO interruption time is associated with a first packet of a plurality of duplicate packets received by the wireless device. The wireless device transmits, to a network node, a report associated with a handover of the wireless device, the report comprising the UP information comprising the at least one HO interruption time associated with the first packet of the plurality of duplicate packets received by the wireless device.

According to certain embodiments, a wireless device is adapted to obtain UP information comprising at least one HO interruption time. The at least one HO interruption time is associated with a first packet of a plurality of duplicate packets received by the wireless device. The wireless device is adapted to transmit, to a network node, a report associated with a handover of the wireless device, the report comprising the UP information comprising the at least one HO interruption time associated with the first packet of the plurality of duplicate packets received by the wireless device.

According to certain embodiments, a method performed by a network node includes receiving, from a wireless device, a report associated with a handover procedure of the wireless device. The report includes UP information comprising at least one HO interruption time being associated with a first packet of a plurality of duplicate packets received by the wireless device.

According to certain embodiments, a network node is adapted to receive, from a wireless device, a report associated with a handover procedure of the wireless device. The report includes UP information comprising at least one HO interruption time being associated with a first packet of a plurality of duplicate packets received by the wireless device.

Certain embodiments may provide one or more of the following technical advantages. For example, one technical advantage may be that certain embodiments allow the network to have UP related information related to the DAPS handover performance. This information would be valuable both for the source and target nodes to optimize the beam level configurations (e.g., RLM and BFD-BFR resources) as well as handover related parameters (e.g., Cell Individual Offset) or the optimization of the RACH resources at target cell (allocation of dedicated preambles or configured beams for RACH access at HO time).

As another example, a technical advantage may be that certain embodiments aid the network to determine whether a DAPS HO or an ordinary HO is the preferred option for handovers of UEs between certain cells. In addition, it may determine which bearers would benefit from DAPS or not.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
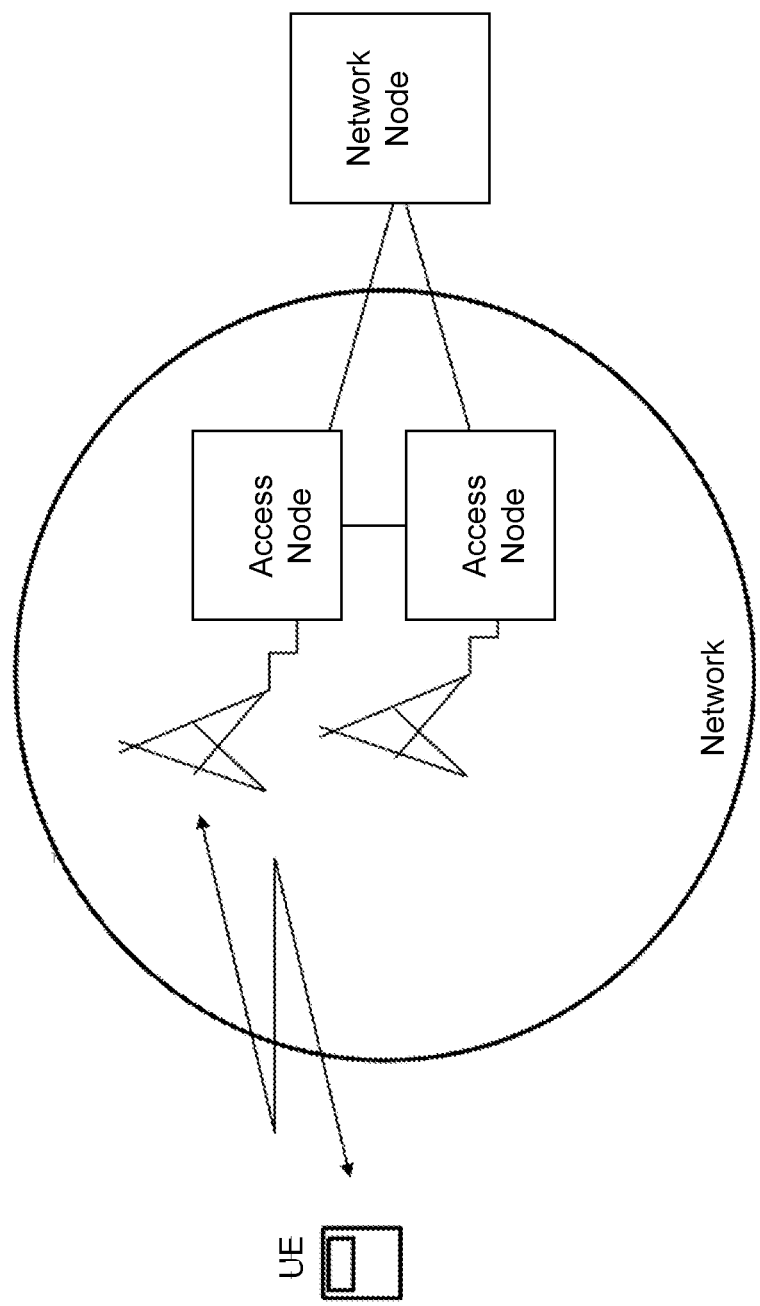
FIG. 1 illustrates a simplified 3rd Generation Partnership Project (3GPP) wireless communication system.
Figure 2:
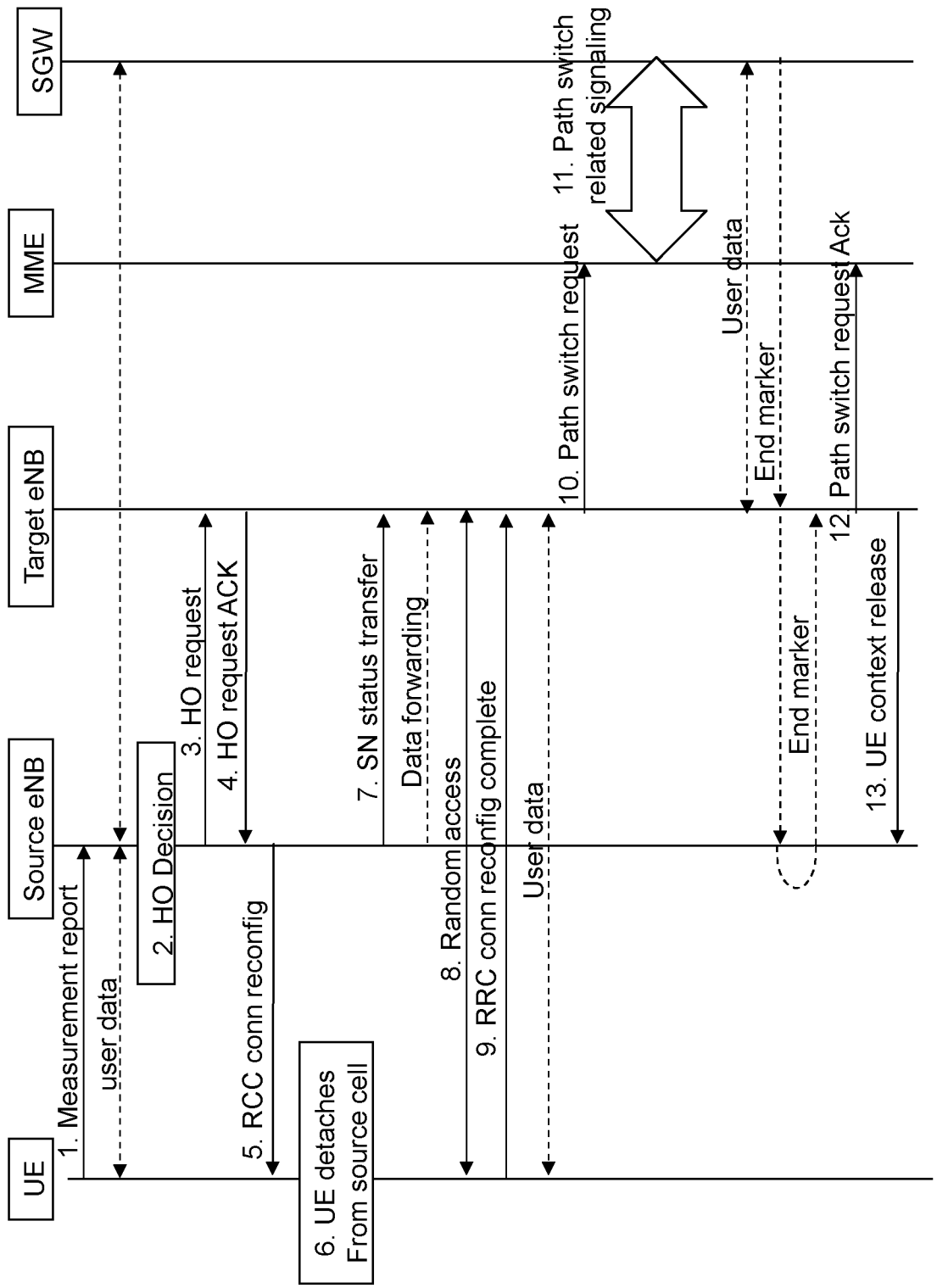
FIG. 2 illustrates the signaling flow between a user equipment (UE), source access node and target access node during a handover procedure, using Long Term Evolution (LTE) as example.
Figure 3:
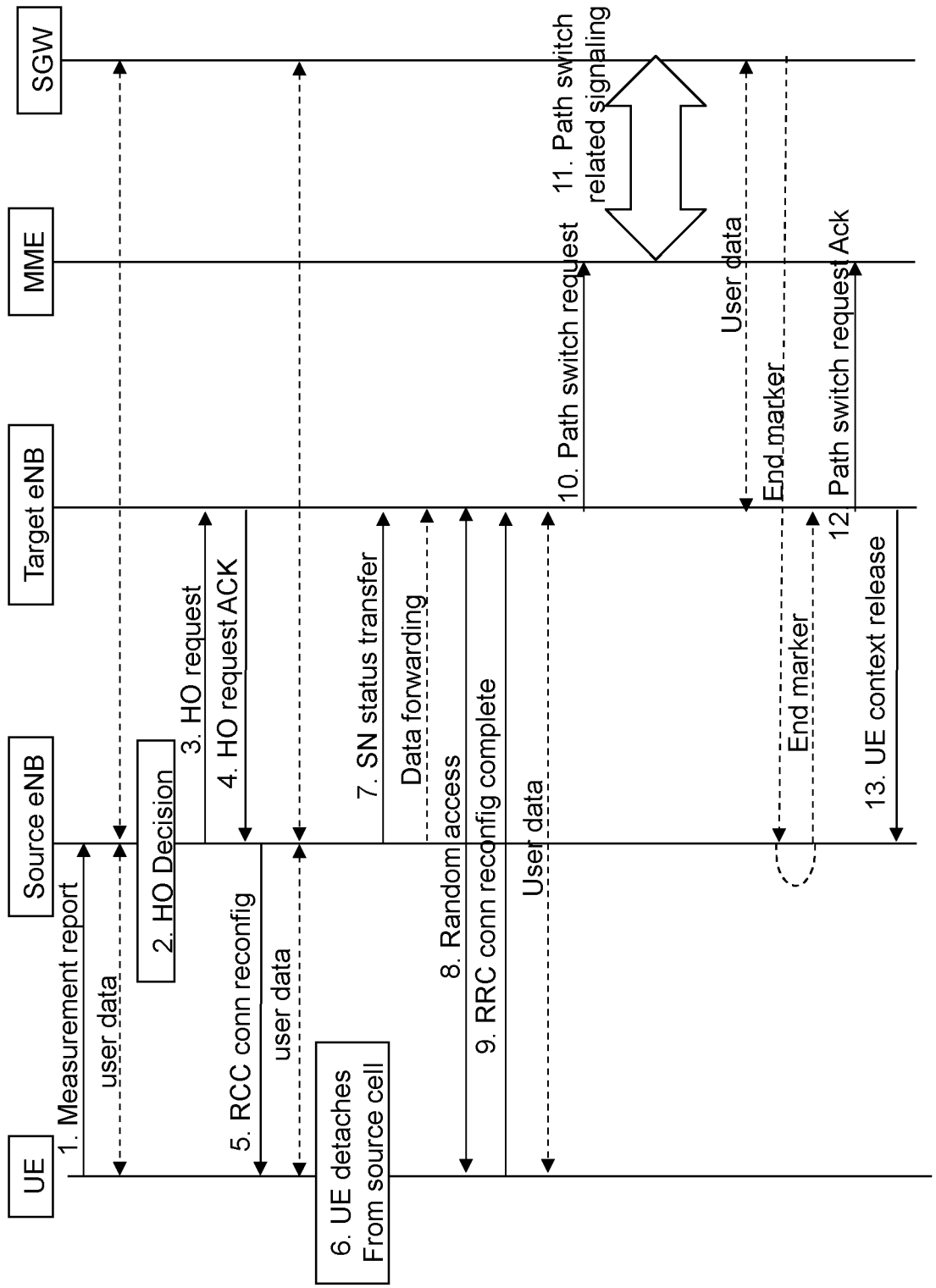
FIG. 3 illustrates example signaling according to the Release-14 LTE MBB.
Figure 4:
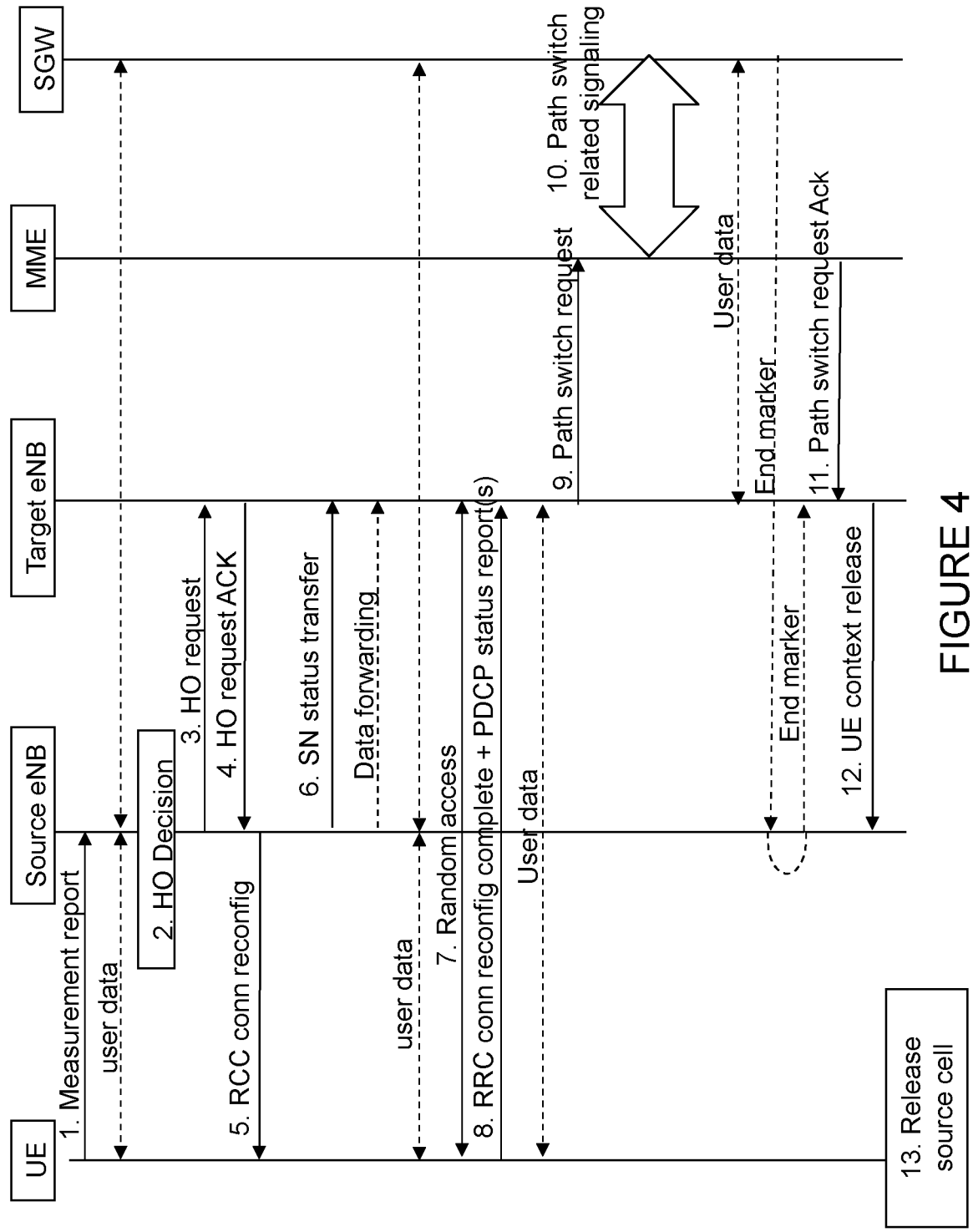
FIG. 4 illustrates an example of a Dual Active Protocol Stack (DAPS) inter-node handover for the case of LTE.
Figure 5:
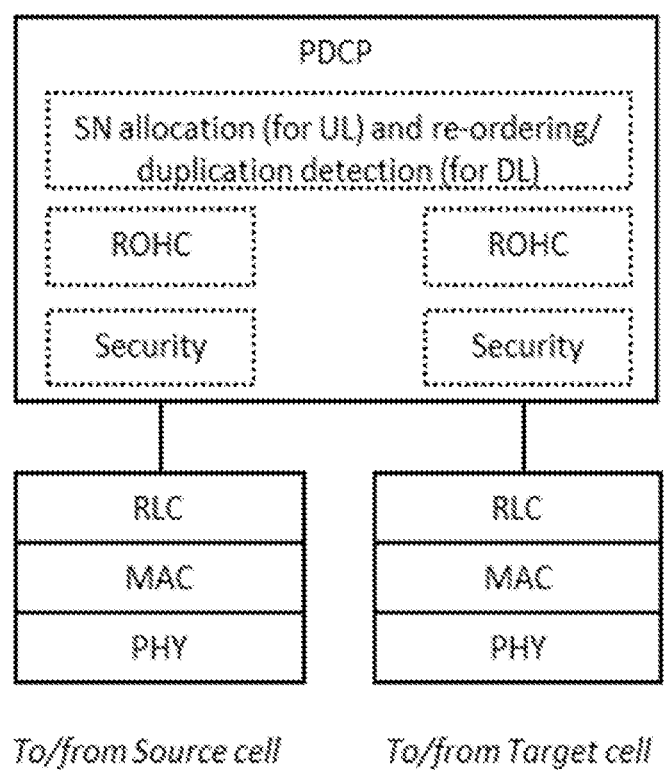
FIG. 5 illustrates the protocol stack at the UE side at DAPS handover.
Figure 6:
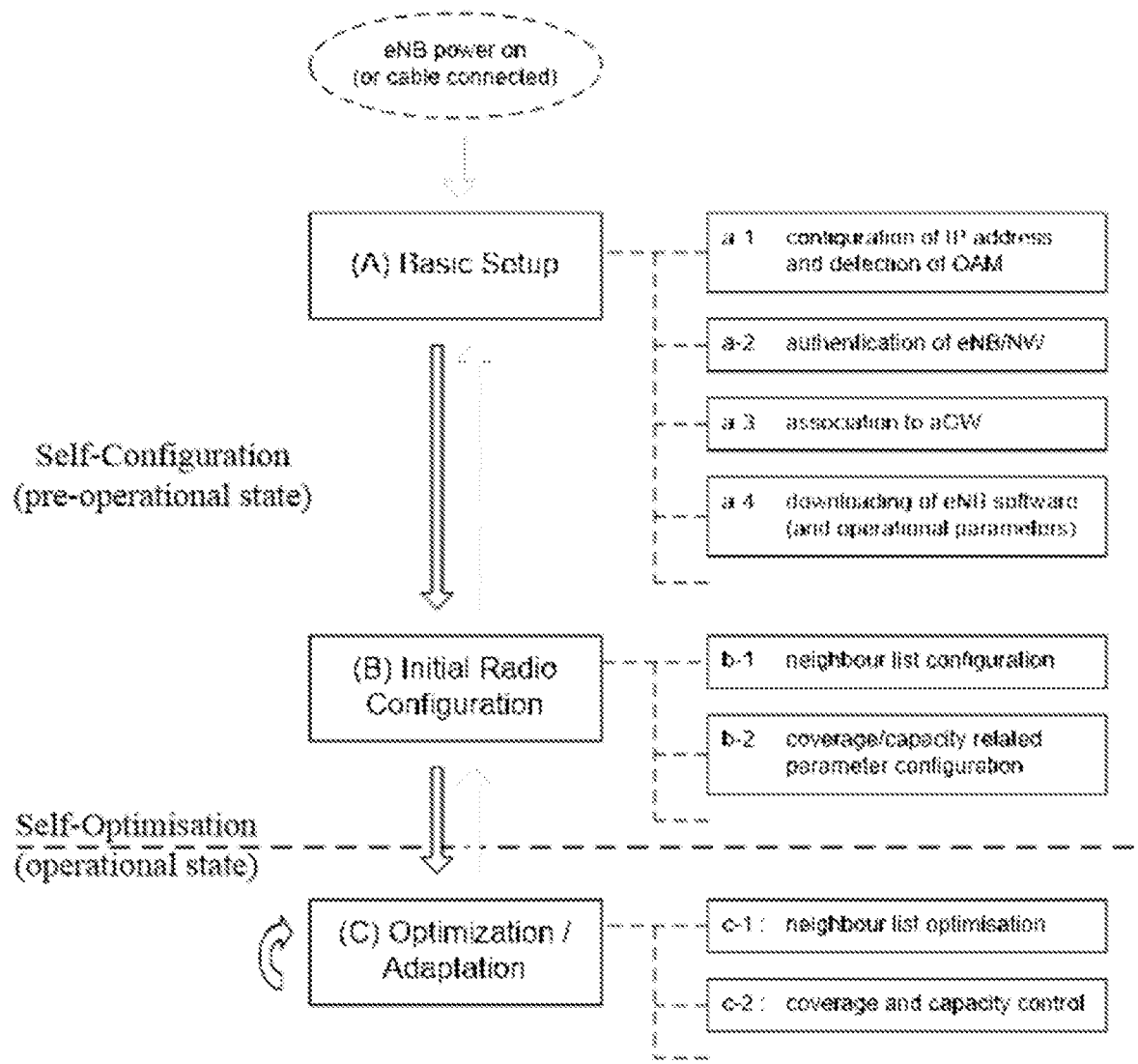
FIG. 6 illustrates the ramifications of Self-Configuration/Self-Optimization functionality as disclosed in 3GPP TS 36.300 v.16.2.0.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, a first set of information may be included in a successful handover report or in an RLF report (or handover failure message) indicating that the UE did not succeed with the handover to the target cell but it succeeded with fallback to source cell, or that it did not succeed neither with the handover to the target cell, nor with fallback to source cell. As used herein, the term fallback and the procedure for falling back refers to the wireless device returning to a source cell configuration and resuming the connection with source cell.

In certain embodiments, the set of information may be included both in the case the UE is configured for DAPS HO, and in case an ordinary non-DAPS HO is triggered.

According to certain embodiments, methods by the wireless device may include the inclusion of information associated to a source cell such as, for example, information derived from packet received/transmitted during Dual Active Protocol Stack (DAPS) handover and/or information associated to a target cell such as, for example, information derived from packet received/transmitted during DAPS handover. Examples of information are number of transmitted/received packets via source/target, delays associated, inter-arrival times, sequence numbers, handover interruption times, etc.

The method also comprises the transmission of that information to a target network node such as, for example, a target node where the UE has accessed during a DAPS handover. The method comprises the target network node tuning/optimizing/setting its own parameters based on the report, and/or forwarding the report content to a source network node (e.g. source node that has configured a DAPS handover), which may tune its own parameters based on the report, e.g., determine whether DAPS is to be configured for a given bearer, etc. According to certain embodiments, source cell information may be useful at the target network node so the target node understands performance for packets transmitted by the source node, and received by the UE via the source node (such as, for example, possibly using assistance information obtained via inter-node messages). This information may be used to tune/optimize target node parameters or generate counter and/or events and/or Key Performance Indicators (KPI) associated to DAPS performance. According to certain embodiments, source cell information may be useful at the source network node, so the source understands performance for packets transmitted by the source node and possibly successfully received by the UE or not; This information may be used to tune/optimize source node parameters or generate counter and/or events and/or Key Performance Indicators (KPI) associated to DAPS performance.

According to certain embodiments, target cell information may be useful at the source network node, so the source understands performance for packets transmitted by the target node and possibly successfully received by the UE or not; This information may be used to tune/optimize source node parameters or generate counter and/or events and/or Key Performance Indicators (KPI) associated to DAPS performance.

According to certain embodiments, target cell information may be useful at the target network node, so the source understands performance for packets transmitted by the target node and possibly successfully received by the UE or not; This information may be used to tune/optimize source node parameters or generate counter and/or events and/or Key Performance Indicators (KPI) associated to DAPS performance.

HO Interruption Time for DL

In a particular embodiment, a separate HO interruption time may be measured for each DRB the UE has currently configured, in which case the HO interruption time amounts to the inter-arrival time between last packet of a given bearer received in source and first packet of the same bearer received in target (both for DAPS and non-DAPS bearer). In a further particular embodiment, the HO interruption time is calculated at reception of the first packet of the same bearer received in target. This implies that successive packets of the same bearer possibly received from the source node after reception of the first packet from the target node (as it can happen in case of DAPS HO) are ignored/not considered for the computation of the HO interruption time.

In another particular embodiment, a separate HO interruption time is only measured for certain bearer(s), such as the highest priority bearer having highest 5QI/QCI value, or the highest priority bearers having 5QI/QCI priority highest than a certain value, or only for the bearers indicated by the network.

In another particular embodiment, a single HO interruption time is measured representing the inter-arrival time between last packet received in source and first packet in target irrespective of the bearer to which such packets are associated. In a further particular embodiment, the HO interruption time is calculated at reception of the first packet received in target. This implies that successively packets possibly received from the source node after reception of the first packet from the target node (as it can happen in case of DAPS HO) are ignored/not considered for the computation of the HO interruption time. As an illustrative example, time T is calculated at reception of a packet T5 from target, which as in this case may be a duplicate of an already received packet from the source, i.e. S5. Time T amounts to the time between the last received packet from source (S5) to T5. Any packet received from the source or from the target after the first packet received from the target, i.e. T5, are not considered for the computation of the HO interruption time T.

In another particular embodiment, the HO interruption time T1-T0 for DL can be measured at least in one of the ways defined below:
The time the UE stops receiving packets from the source node (T0) until the time (T1) the UE receives the first packet from the target node (after random access and transmission of the RRC Reconfiguration Complete).
The time the UE stops receiving packets from the source node (T0) until the time (T1) the UE transmits the RRC Reconfiguration Complete in response to the RRC Reconfiguration message from target including the DAPS release message;
The time the UE receives the HO command from source (T0) until the time (T1) the UE receives the first packet from target (after random access and transmission of the RRC Reconfiguration Complete).

In a particular embodiment, the above measurements are only reported if the HO interruption time(s) exceed(s) a certain threshold as configured by the network. Alternatively, the measurements may only be logged if the HO interruption time(s) exceed(s) a certain threshold as configured by the network. In the later case, an availability indicator is included in a complete message only if that condition is fulfilled. In another particular embodiment, is the measurements are logged and/or reported per bearer. The reasoning is that the network can determine to configure APS per bearer.

In the above, it has been described how the UE measures various time between packets received from the source and packets received from the target, etc. In a particular embodiment, the UE will when it receives packets from the source and the target first apply a discard procedure to discard duplicated packets and after that perform the measurements described above. The measurements will only be performed on the packets that have not been discarded in the discard procedure.

For example, the UE may receive a first set of packets from a first node and a second set of packets from the second node. If some of the packets in the first and second set may be duplicates, the UE would apply a duplicate discard method where duplicated packets are discarded. In a further particular embodiment, the UE determines a time, T, which is the time from the last received non-duplicated packet from the first node to the time of the first received non-duplicated packet from the second node.

In still a further embodiment, this time T may be computed and stored at reception of the first non-duplicated packet from the second node, and it is only computed once for a given HO. This implies that any additional packet possibly received from the first node after reception of the first non-duplicated packet from the second node (as it can happen in case of DAPS HO) are ignored/not considered for the computation of T. As an illustrative example, time T is calculated at reception of the first non-duplicate packet received from the target. Time T amounts to the time between the last received non-duplicated packet from source to reception of the first non-duplicate packet received from the target. Any packet received from the source or from the target after the first non-duplicate packet received from the target are not considered for the computation of the HO interruption time T.

In another embodiment, the UE might include multiple timer values using which the network can compute the time between the reception of the last non-duplicated packet from the first node and the reception of the first non-duplicated packet from the second node. As part of such a measurement, the UE could include;

Timer-T1: The UE starts this timer at the reception of a DAPS handover command and stops this timer at the reception of the last packet from the first node (source node).

Time-T2: The UE starts this timer at the reception of a DAPS handover command and stops this timer at the reception of the first packet from the second node (target node).

Based on the values of T1 and T2, the network can estimate the time between the reception of the last non-duplicated packet from the first node and the reception of the first non-duplicated packet from the second node by computing (T2-T1). If so computed value is very small (a negative value or zero), then the network can interpret that the DAPS handover has been successful in ensuring that the application can get a continuous stream of packets.

In a particular embodiment, the UE could also report a timer-T3 which is stared at the reception of a DAPS handover command and stopped at the reception of the first packet from the second node (target node). This value is useful in conjunction with timer-T1 to understand for how long during DAPS handover did the UE receive only from the first node (source node).

It may be noted that, as used herein, the term 'reception' above refers to successful reception of the packet.

In a particular embodiment, when the UE is configured with a Quality of Experience (QoE) reporting, the UE includes the application level interruption experienced at the time of the DAPS handover. In such a scenario, the QoE report includes a handover interruption time which is at least one of the following:

the maximum time duration between the reception of the DAPS handover command from the first node (source node) and the source DAPS release command (daps-SourceRelease) from the second node (target node) when no packets were delivered to the UE's application layer.

the maximum time duration between the reception of the DAPS handover command from the first node (source node) and the first non-duplicated packet from the second node (target node) when no packets were delivered to the UE's application layer.

The UE reports the time T, e.g. when the RLF-report of successful HO report is requested by the network. This means that the UE may determine the time from the last non-duplicated packet that is received (e.g. for a given bearer) from the source to the first non-duplicated packet that the UE received from the target.

By considering a particular scenario where the UE receives packets number 1, 2 and 3 from a source and target node: if the UE receives packet number 1 and number 2 from the source base station and receive packet number 2 and number 3 from the target the UE would consider packet number 2 received from the target to be a duplicate (if the UE received packet number 2 from the target after it has received packet number 2 from the source). The UE would discard the duplicated packet number 2 and perform the measurement. For example, the UE may measure the time from receiving packet number 2 from the source until it receives packet number 3 from the target.

If the UE receives packet number 2 from the target before it receives packet number 2 from the source, the UE would consider packet number 2 from the source to be a duplicate packet and would discard it. This means that the UE may measure and store the time T elapsing between packet number 1 from the source and packet number 2 from the target. In case, the UE receives a non-duplicated packet number 3 from the source afterwards, that will not be used to compute T even if that is non-duplicated, i.e. T is only computed (and hence stored) once for each HO procedure.

According to certain embodiments, the above computation may be executed at the layer performing duplication detection, e.g. the PDCP layer.

According to certain embodiments, one possible advantage is that based on information reported by the UE concerning the HO interruption time, possibly per bearer, the network can determine to configure DAPS HO or not, possibly per bearer. This would also allow the computation on the network side of Key performance indicators, definition of counter/events enabling network to understand the performance of the feature.

HO Interruption Time in UL

The representation of the HO interruption is same as for the DL case with the only difference that the HO interruption time amounts to the inter-arrival time between the last packet successfully transmitted, i.e. acknowledged by the source, received in source and first packet successfully transmitted in target, i.e. acknowledge by the target, wherein, as for the DL case, the concerned last and first packet may be associated or not associated to the same data radio bearer.

According to certain embodiments, one possible advantage is that based on information reported by the UE concerning the HO interruption time, possibly per bearer, the network can determine to configure APS HO or not, possibly per bearer. This would also allow the computation on the network side of Key performance indicators, definition of counter/events enabling network to understand the performance of the feature. Number/Volume of DL PDCP duplicates detected by the UE during DAPS handover.

In a particular embodiment, the above measurement may only be reported if the amount/volume of duplicates exceeds a certain threshold as configured by the network. For example, the wireless device (i.e., UE) may generate the report when an amount or volume of the UP information exceeds a threshold value.

In another embodiment, the information may only be logged if the Number/Volume of DL PDCP duplicates detected by the UE, during DAPS handover, exceed(s) a certain threshold as configured by the network. In that sense, an availability indicator may be included in a complete message only if that condition is fulfilled. In a particular embodiment, that the availability indicator is a count value, like an integer (e.g. N=12) where the UE counts the number of duplicates.

In another particular embodiment, the UE logs the exact sequence number(s) for the duplicated values. Thus, the log may include a list of integers. The list of exact sequence numbers may enable the network to be aware of which exact packets were sent duplicated and successfully received by the UE. In another particular embodiment, the UE logs a data volume value such as, for example, in bytes/bits/Kbytes, etc.

In a particular embodiment, the detection during DAPS handover means that these are packets received by source and target after the UE receives from source a HO command with DAPS indication and before the UE receives an RRC Reconfiguration from target including a DAPS source release indicator. After this, the UE stops measurement and/or logging the information. In another particular embodiment, this metric is provided for packets received between transmission of Msg3 to target and reception of daps-SourceRelease RRCReconfiguration message also from target.

Number/Volume of DL PDCP PDUs Correctly Received by the UE from the Source During DAPS Handover In a particular embodiment, the above measurement(s) are only reported if the amount/volume of DL PDCP PDUs correctly received is smaller than a certain threshold as configured by the network. Alternatively, the information is only logged if the Number/Volume of DL PDCP PDUs correctly received by the UE from the source during DAPS handover exceed(s) a certain threshold as configured by the network.

For example, an availability indicator may be included in a complete message if that condition is fulfilled. In a particular embodiment, the detection during DAPS handover means that these are packets received by source and target after the UE receives from source a HO command with DAPS indication and, before the UE receives an RRC Reconfiguration from target including a DAPS source release indicator. After this, the UE stops measurement and/or logging the information.

In another embodiment, this metric is provided for packets received between transmission of Msg3 to target and reception of daps-SourceRelease RRCReconfiguration message also from target.

Number/Volume of DL MAC/RLC PDUs Received from Source but not ACKed Due to Single TX Operations During DAPS In a particular embodiment, the above measurement(s) are only reported if the amount/volume of DL MAC/RLC PDUs received from source but not ACKed is smaller than a certain threshold as configured by the network. The start time for such any of the above measurements may be one of:
 the time of receiving the DAPS handover configuration
 the time initiating the random access to the DAPS target cell The end time for such a measurement may be one of:
 the time of receiving the daps-SourceRelease from the target of DAPS handover.
 The time of sending the RRCReconfiguraitonComplete message to the target cell
 The time of declaring the RLF in the target of DAPS handover if this RLF is declared before receiving the daps-SourceRelease message.
 The time of declaring failure of handover to the target cell, i.e. T304 expiry, upon which the UE may fallback to source cell (if RLF towards the source cell has not been declared yet) or select for reestablishment another cell different from the source and the target (if RLF towards the source cell has also been declared)
 The time of declaring RLF to the source cell (e.g. T310 expiry, maximum number of RLC retransmission attempts reached, etc.) while performing DAPS HO. In another embodiment this metric is provided for packets received between transmission of Msg3 to target and reception of daps-SourceRelease RRCReconfiguration message also from target According to certain embodiments, information related to the possible collisions of UL transmissions to be performed in the target cell, and UL transmissions (e.g. HARQ ACK/NACK, CSI) to be performed in the source cell, wherein such collisions may be collected by the UE if it is not capable to perform simultaneous UL transmissions to the source and to the target, and wherein such information may include:
 The number of colliding UL transmissions.
 The time at which the collision occurs, e.g. represented by a bitmap indicating the slots within a radio frame or within the SFN.

The start time to collect the above information measurement may be one of:
 the time of receiving the DAPS handover configuration
 the time initiating the random access to the DAPS target cell The end time for such a measurement may be one of:
 The time of receiving the daps-SourceRelease from the target of DAPS handover.
 The time of sending the RRCReconfigurationComplete message to the target cell.
 The time of declaring the RLF in the target of DAPS handover if this RLF is declared before receiving the daps-SourceRelease message.
 The time of declaring RLF to the source cell (e.g. T310 expiry, maximum number of RLC retransmission attempts reached, etc.) while performing DAPS HO.

According to certain embodiments, the information may include a number of UL PDCP/RLC PDUs which the UE sent to the source of the DAPS handover and for which it did not receive ACK from the source. As a result, the UE may send these same packets to the target of DAPS handover. The start time for such a measurement may be one of:
 The time of receiving the DAPS handover configuration,
 The time initiating the random access to the DAPS target cell.

The end time for such a measurement may be one of:
 The time of receiving the daps-SourceRelease from the target of DAPS handover,
 The time of sending the RRCReconfiguraitonComplete message to the target cell,
 The time of declaring the RLF in the target of DAPS handover if this RLF is declared before receiving the daps-SourceRelease message.

According to certain embodiments, the information may include a time duration during which the UE was unable to send data on UL PUSCH towards either the source node (first network node) or the target node (second network node). Additionally or alternatively, the information may include a time duration between transmission of Msg3 to target and reception of daps-SourceRelease RRCReconfiguration message also from target. In a particular embodiment, for example, the Msg3 comprises in its payload an RRCReconfigurationComplete transmitted to target as part of the DAPS handover procedure. This timer can help the network determine for how long the UE received DL PDUs from the source RAN node while connected to the target node. The UE may not be able to perform UL to the source once connection to the target (i.e. signaling of Msg3) occurs. For this reason, the UE may not be able to signal ACK/NACK for the PDU received by the source once it connects to the target. It is therefore important to know for how long the UE received DL PDUs from source without being able to ack its reception and combine such metric with other metrics relative to PDU reception.

In a particular embodiment, the network node receiving the information from the UE may evaluate how PDUs were received during the time window between transmission of Msg3 to target and reception of daps-SourceRelease RRCReconfiguration message. For example, the node may evaluate the following metrics:
 Number/Volume of DL PDCP duplicates detected by the UE during DAPS handover received between transmission of Msg3 to target and reception of daps-SourceRelease RRCReconfiguration message also from target,
 Number/Volume of DL PDCP PDUs correctly received by the UE from the source during DAPS handover received between transmission of Msg3 to target and reception of daps-SourceRelease RRCReconfiguration message also from target, and/or Number/Volume of DL MAC/RLC PDUs received from source but not ACKed due to single TX operations during DAPS received between transmission of Msg3 to target and reception of daps-SourceRelease RRCReconfiguration message also from target.

The network node may take one or more actions once the comparison and analysis of metrics is carried out. For example, if the target network node realizes that during the reported time window there was a high number of duplicate packets, the target network node may decide to anticipate signaling of daps-SourceRelease RRCReconfiguration because the UE entering the target cell has sufficiently good data channel quality to correctly receive packets from the target network node. Conversely, if the target network node realizes that during the reported time window there was a high number of correctly received by the UE from the source but very few duplicate packets, the target network node may decide to delay signaling of daps-SourceRelease RRCReconfiguration because the UE entering the target cell may not have sufficiently good data channel quality to correctly receive packets from the target network node.

Time Duration Between Reception of the DAPS HO Command i.e. RRC Reconfiguration from Source Until the Time the UE Receives the DAPS-SourceRelease RRCReconfiguration Message from Target According to certain embodiments, the information may include a time duration between the reception of the DAPS HO command, which may include a RRC Reconfiguration from the source network node, until the time the UE receives the DAPS-SourceReleaseReconfiguration message from the target node. This is the time that would be equivalent to an interruption time that is somewhat reduced with DAPS.

Information Regarding Traffic Pattern for a Given Bearer

In a particular embodiment, the information may include information relating to the traffic pattern for a given bearer. This may correspond to inter-arrival intervals of packets from the source network node after the DAPS HO command is received for a given bearer. For example, the UE may receive a first packet in t0, another one in t1, another in t2, etc. In that case, the UE could log these time intervals and/or the absolute time stamps.

In a particular embodiment, there may be an availability indicator per metric/measurement being proposed. Alternatively, there may be an availability indicator for the whole report, possibly containing one or multiple metrics/measurements being proposed. The availability indicator may be added to a message to the network so the network is aware of the availability of the information/report (e.g., RRCReconfigurationComplete, RRCReestablishmentComplete) and may determine to retrieve it or not.

Trigger for Including the UP Related Measurements

According to certain embodiments, the UE includes the information comprising the above mentioned one or more measurements when the UE is configured with DAPS handover.

In other embodiments, the UE may include the above mentioned one or more measurements when the UE is configured with DAPS handover and when the immediate MDT with the corresponding request for such measurements is included (this could be a new measurement request in the immediate MDT framework). In such a scenario the immediate MDT request could include indication regarding which UP measurements are to be stored by the UE at the time of DAPS HO.

Cell Identifiers to be Included to Aid Message Transfer within the Network

According to certain embodiments, the UE may further include the identifier of the source cell of the DAPS handover and also the target cell of the DAPS handover. This is required for the scenario wherein the DAPS target network node does not fetch the measurements as stored by the UE immediately upon the completion of the DAPS handover. If this report is fetched at a later point in time, then the network needs to know which cell was the source of the DAPS handover and which cell was the target of the DAPS handover.

Further Embodiments Related to the Retrieval of the Report and how that is Logged According to certain embodiments, a method is provided at a target network node for receiving from a UE UP related information such as, for example, in a successful handover report, possibly including performance information related to a DAPS handover such as, for example, information derived from packet received/transmitted during DAPS handover.

In a particular embodiment, the UE logs the handover related information, possibly including DAPS handover information, and when it transmits an RRC Reconfiguration Complete after random access with target cell, the UE includes an availability indicator if a report is available. Upon reception, the target network node can transmit a request message (e.g. UEInformationRequest) requesting the UE to report the handover information, possibly including information regarding the DAPS performance. The UE may respond with a message including the report e.g. UEInformationResponse.

In another particular embodiment, the UE may log the handover related information, possibly including DAPS handover information, and when the UE transmits the RRC Reconfiguration Complete in response to the RRC Reconfiguration from target network node that included the DAPS release indication (e.g. daps-SourceRelease), it may include an availability indicator, if a report is available. Compared to the previous embodiment, this alternative provides a possibility to obtain more DAPS related information between the time the UE accesses the target network node and the time the source network node is released. In other words, the UE is still in some kind of DAPS mode before source network node is released. Thus, it may make sense to continue logging DAPS related information and only report after it receives the DAPS release indication.

In another particular embodiment, the UE may continue to receive packets from the source network node after having received the DAPS source release indication, at least for some time controlled by a timer. The timer starts upon the reception of the RRC Reconfiguration message with the DAPS release indication. In one option, the UE only sends the RRC Reconfiguration Complete in response after the timer expires (or in general, after the time elapses, in case this is a pre-defined time defined in specifications). In another option, the UE sends the RRC Reconfiguration Complete in response when the timer is running.

In a related embodiment, the UE may log the handover related information, possibly including DAPS handover information and continue logging information even after the UE transmits the RRC Reconfiguration Complete in response to the RRC Reconfiguration from target network node. The UE can continue to log that information for a defined amount of time that may be controlled by a timer as the one described above. That can be useful in the sense that, after having received the DAPS release indication from target network node, there may still be some packets transmitted by source network node to the UE. This report can be later transmitted by the UE either in response to a request from the network or, upon the expiry of the timer the UE logs the information and transmits a message to the network.

Figure 7:
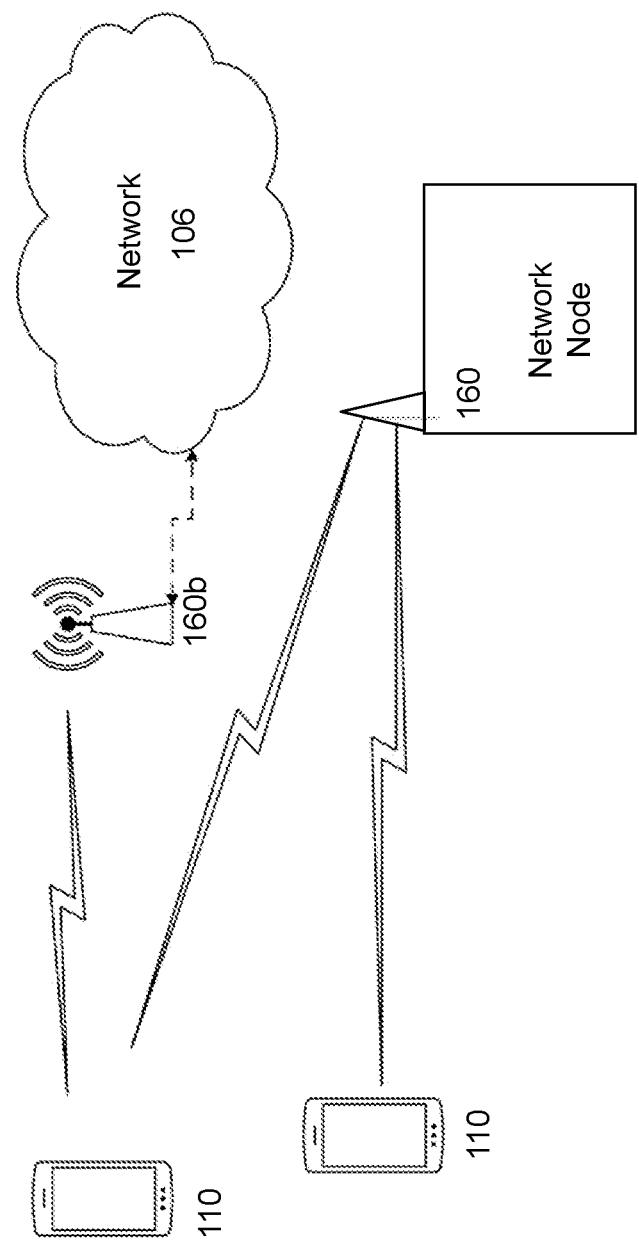
FIG. 7 illustrates an example wireless network, according to certain embodiments.

FIG. 7 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 8:
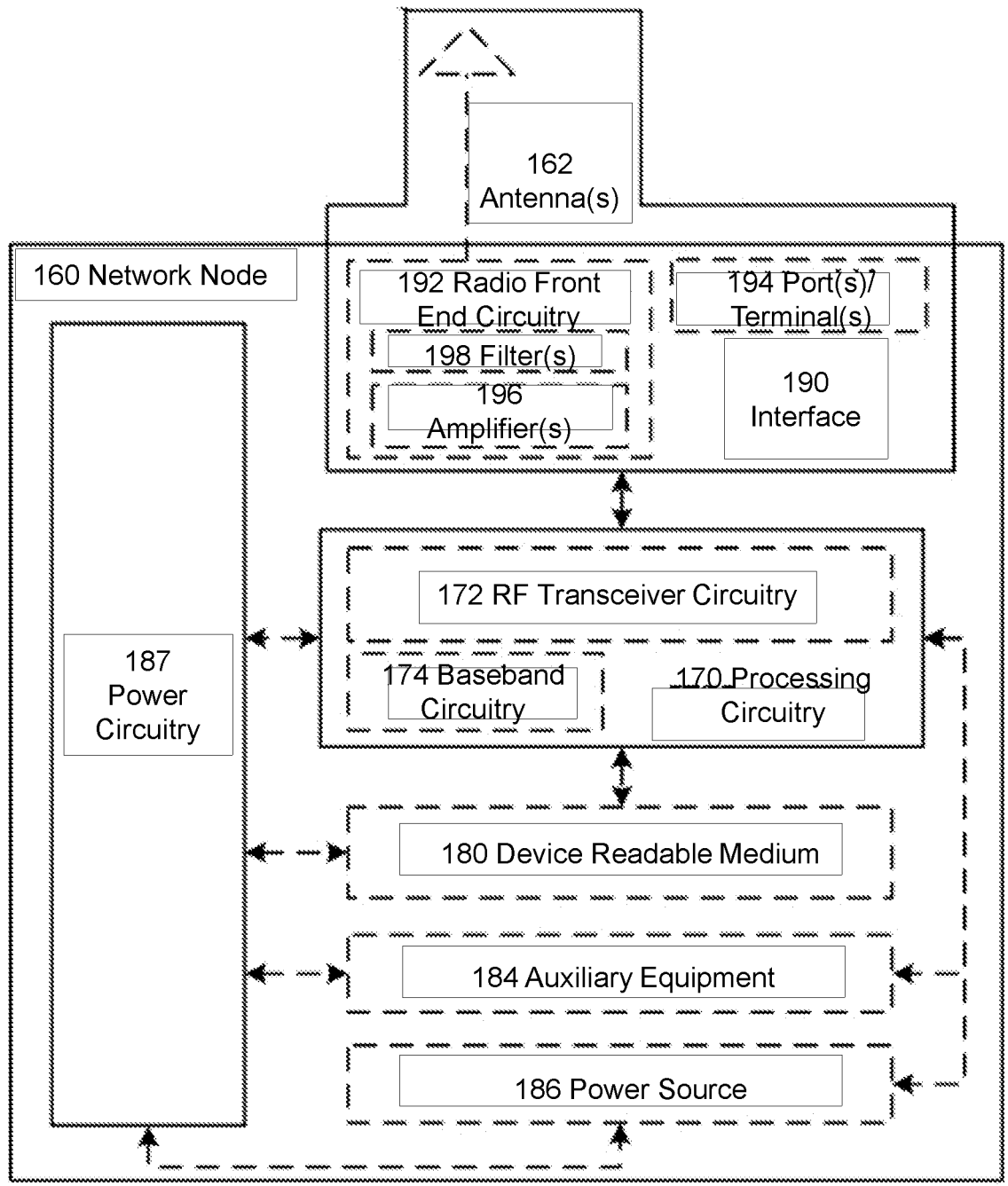
FIG. 8 illustrates an example network node, according to certain embodiments.

FIG. 8 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 9:
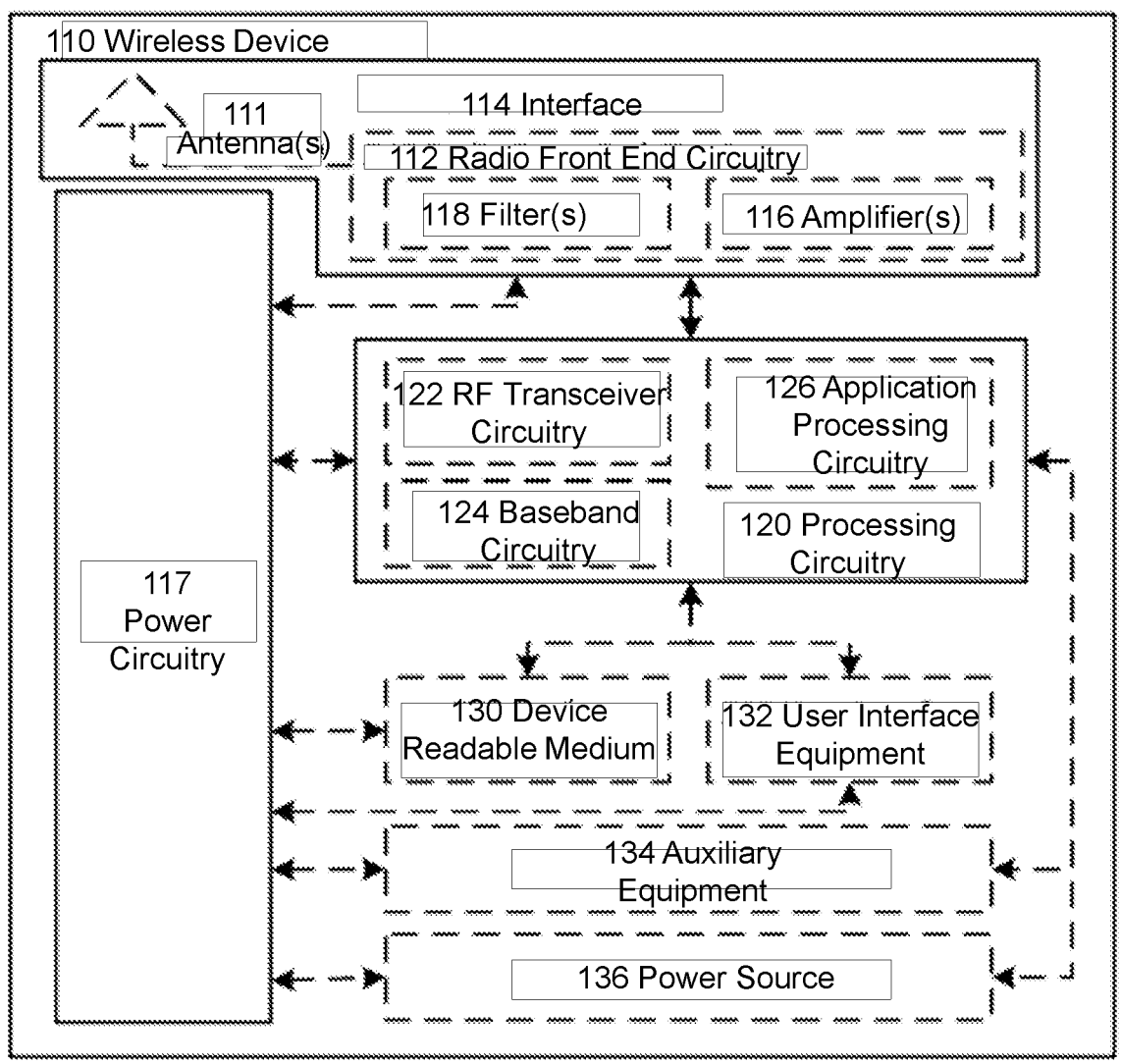
FIG. 9 illustrates an example wireless device, according to certain embodiments.

FIG. 9 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 10:
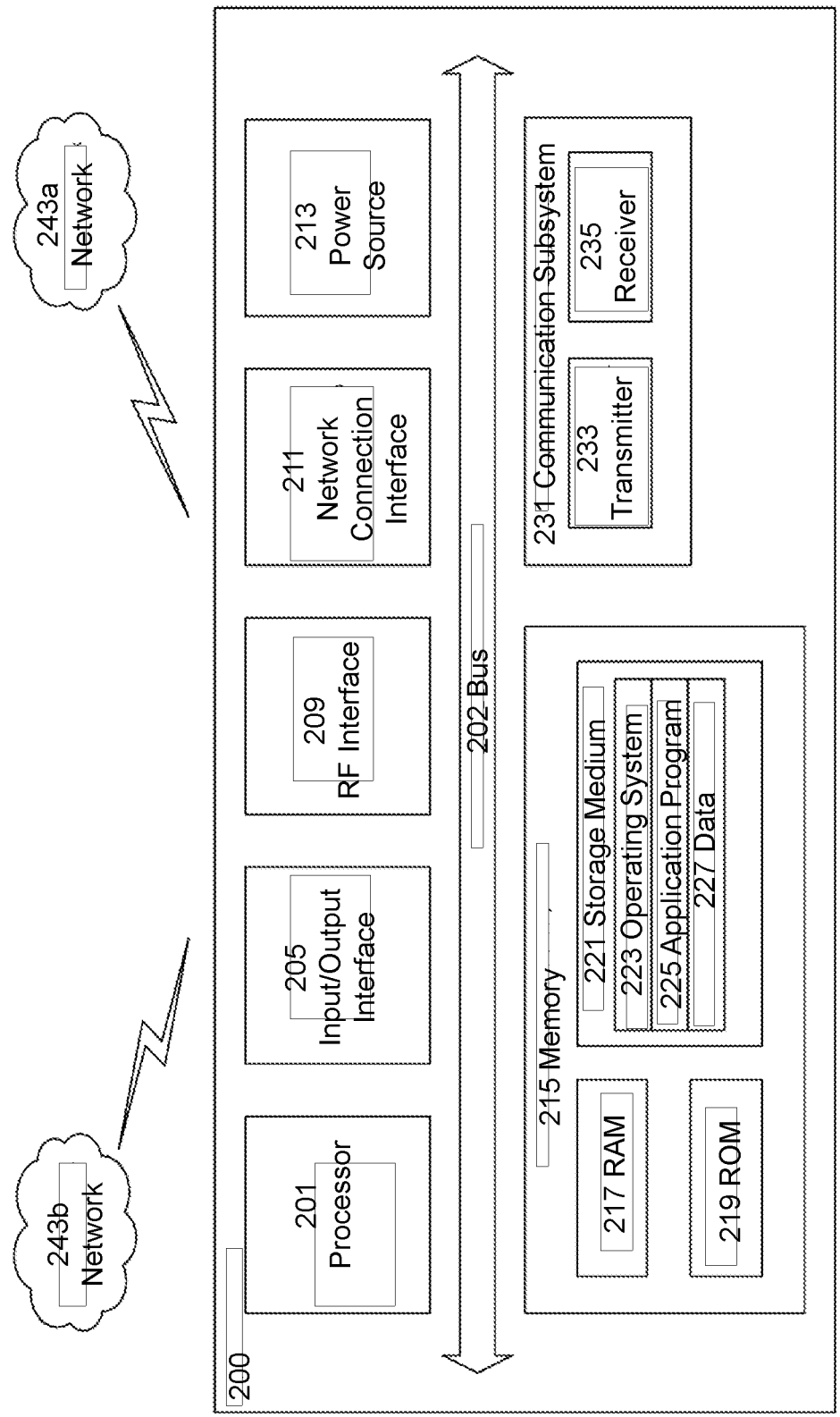
FIG. 10 illustrate an example user equipment, according to certain embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 200 includes processor 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processor 201 may be configured to process computer instructions and data. Processor 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processor 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processor 201 to provide storage or caching of data or computer instructions during the execution of software programs such as the operating system, application programs, and device drivers. ROM 219 may be configured to provide computer instructions or data to processor 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 10, processor 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processor 201 may be configured to communicate with any of such components over bus 202. In another example, any of such components may be represented by program instructions stored in memory that when executed by processor 201 perform the corresponding functions described herein. In another example, the functionality of any of such components may be partitioned between processor 201 and communication subsystem 231. In another example, the non-computationally intensive functions of any of such components may be implemented in software or firmware and the computationally intensive functions may be implemented in hardware.

Figure 11:
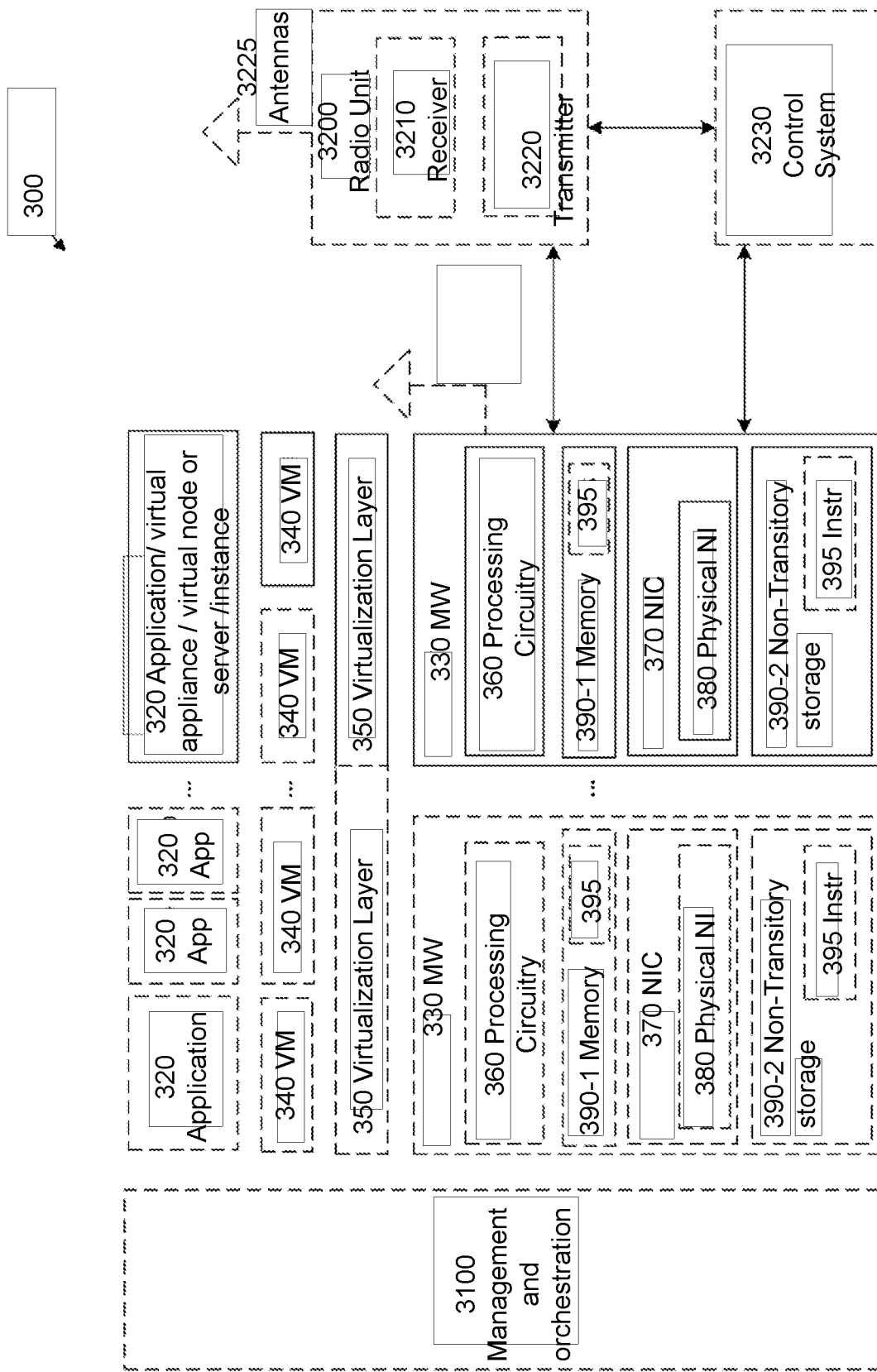
FIG. 11 illustrates a virtualization environment in which functions implemented by some embodiments may be virtualized, according to certain embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides middleware (MW) 330 comprising processing circuitry 360 and memory 390-1. Memory 390-1 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device 330 may comprise memory 390-1 which may be non-persistent memory for temporarily storing instructions 395 or software executed by processing circuitry 360. Each hardware device 330 may comprise one or more network interface controllers (NICs) 370, also known as network interface cards, which include physical network interface 380. Each hardware device 330 may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines (VMs) 340 as well as software allowing it to execute functions, features and/or benefits described in relation with some embodiments described herein.

VMs 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, VM 340 may be a software implementation of a physical machine that runs programs as if they were executing on a physical, non-virtualized machine. Each of VMs 340, and that part of hardware 330 that executes that VM, be it hardware dedicated to that VM and/or hardware shared by that VM with others of the VMs 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 11.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 12:
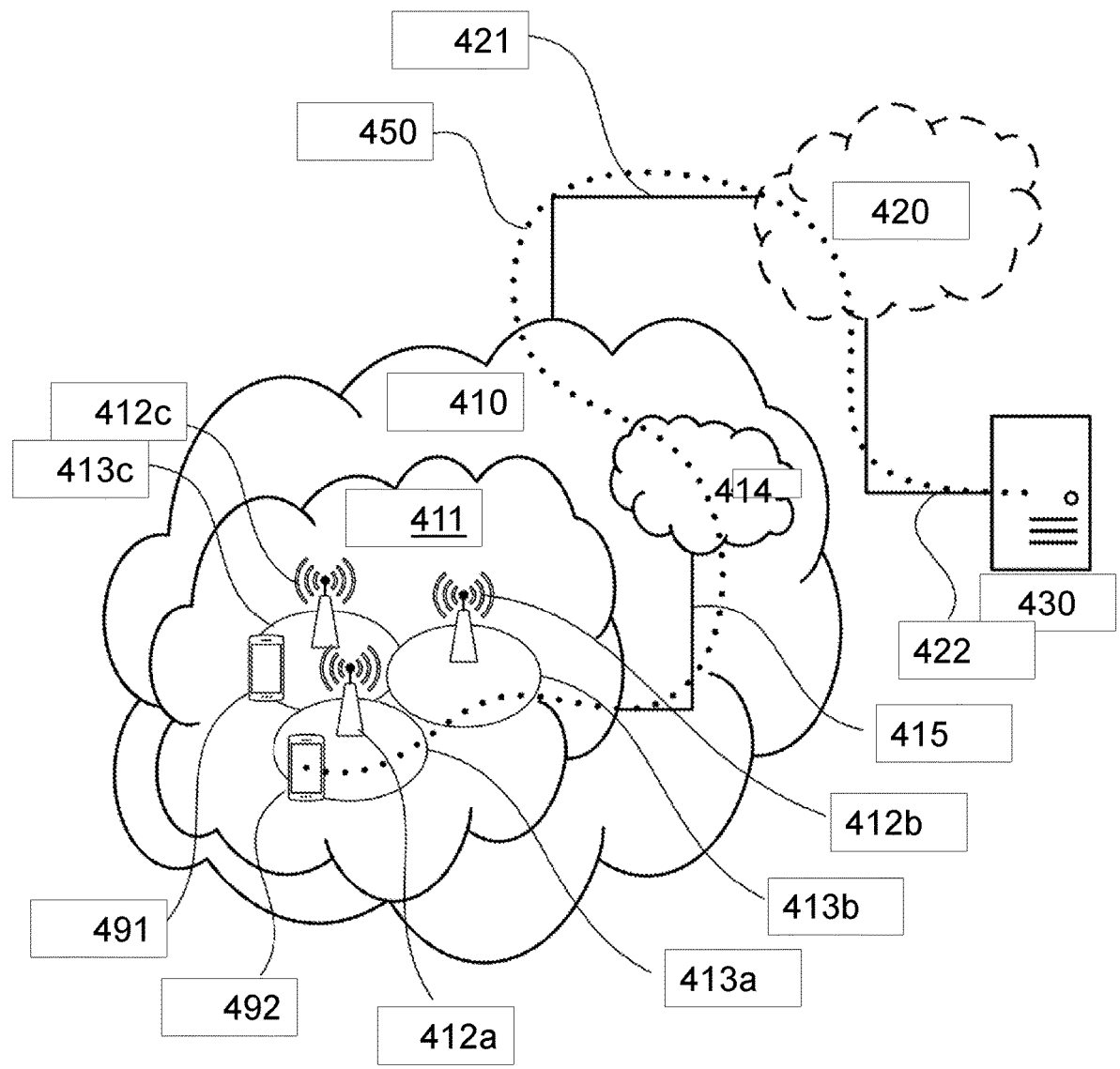
FIG. 12 illustrates a telecommunication network connected via an intermediate network to a host computer, according to certain embodiments.

FIG. 12 illustrates a telecommunication network connected via an intermediate network to a host computer in accordance with some embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 13:
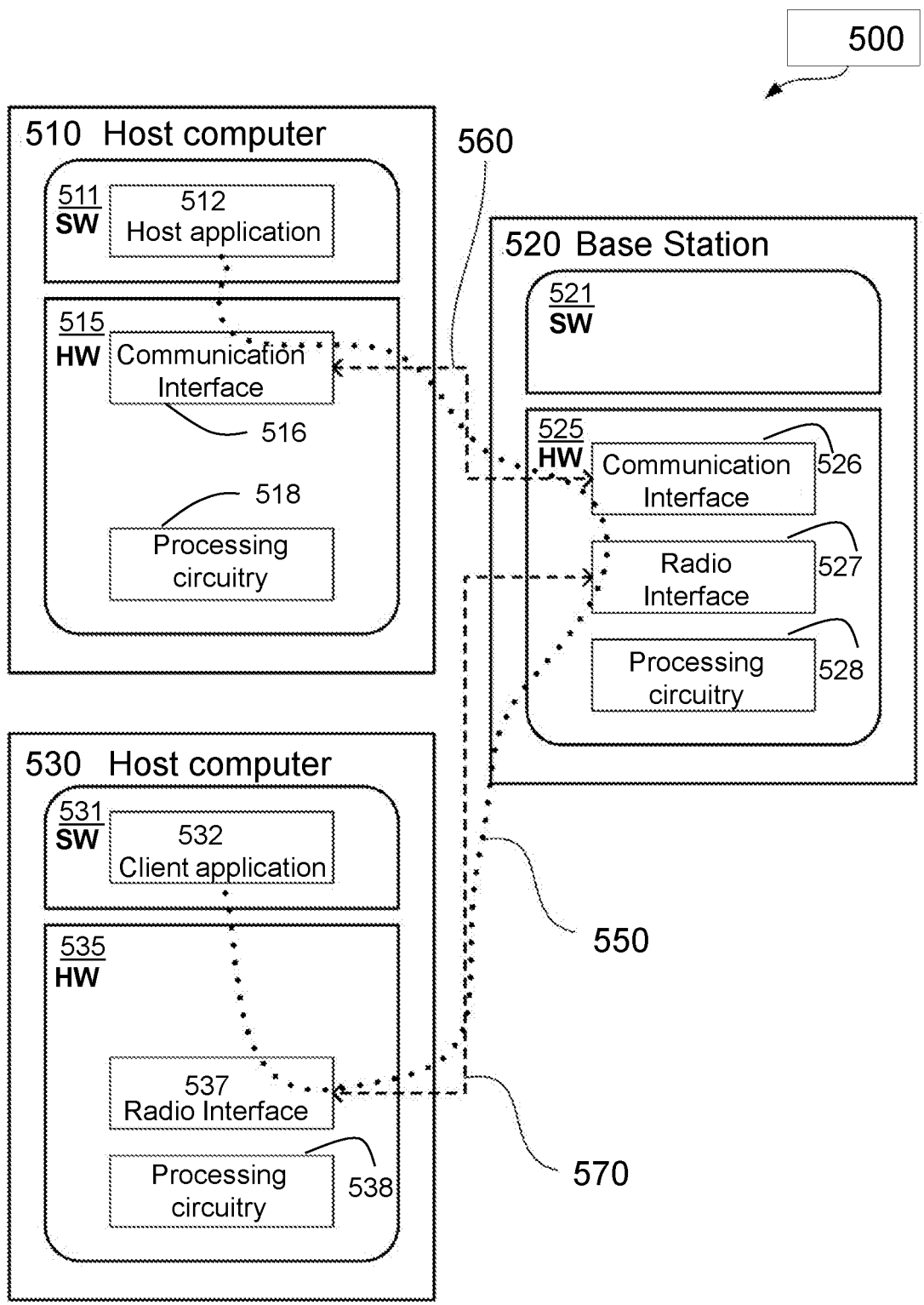
FIG. 13 illustrates a generalized block diagram of a host computer communicating via a base station with a user equipment over a partially wireless connection, according to certain embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 13 may be similar or identical to host computer 430, one of base stations 412a, 412b, 412c and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 14, 15:
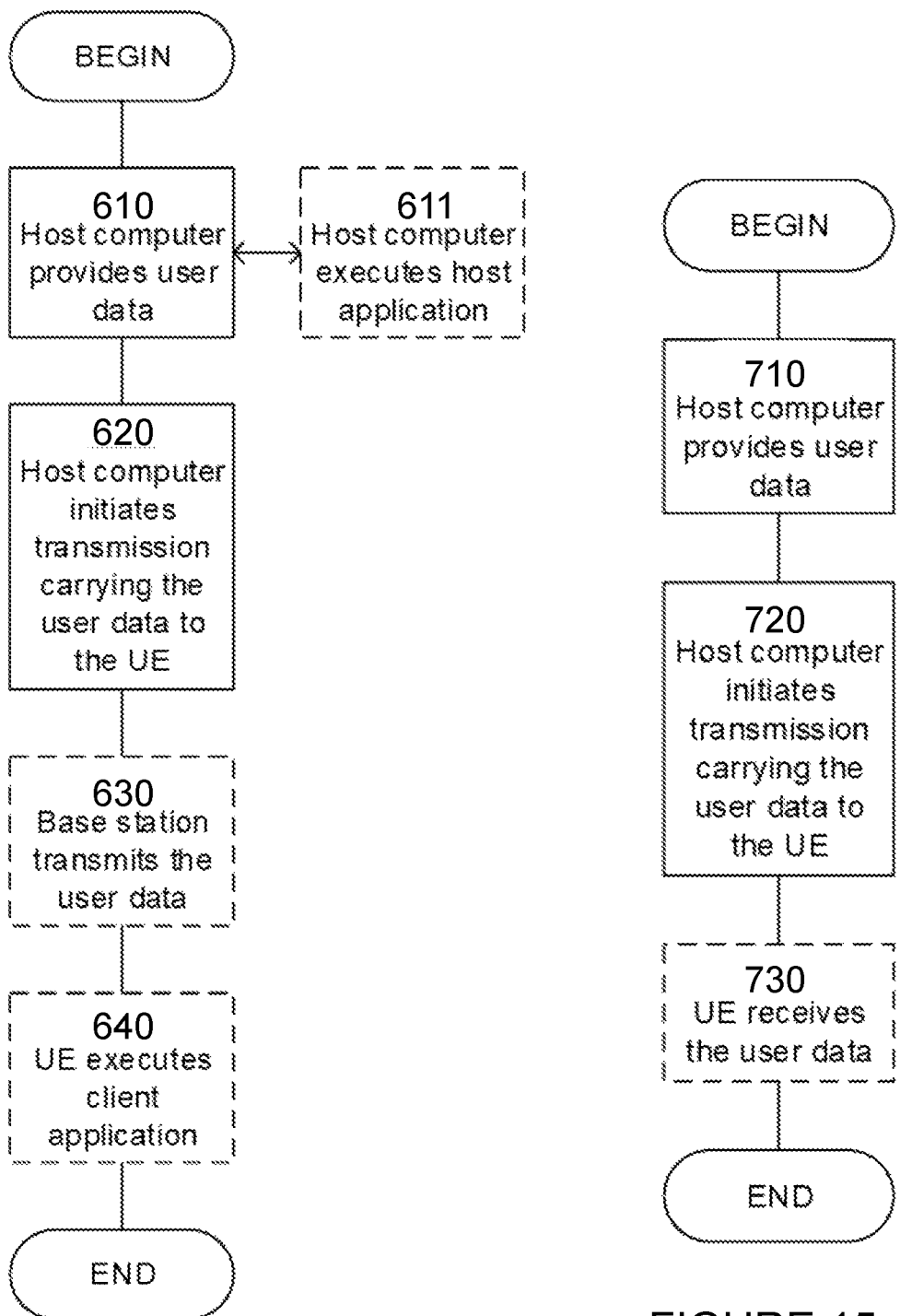
FIG. 14 illustrates a method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 16, 17:
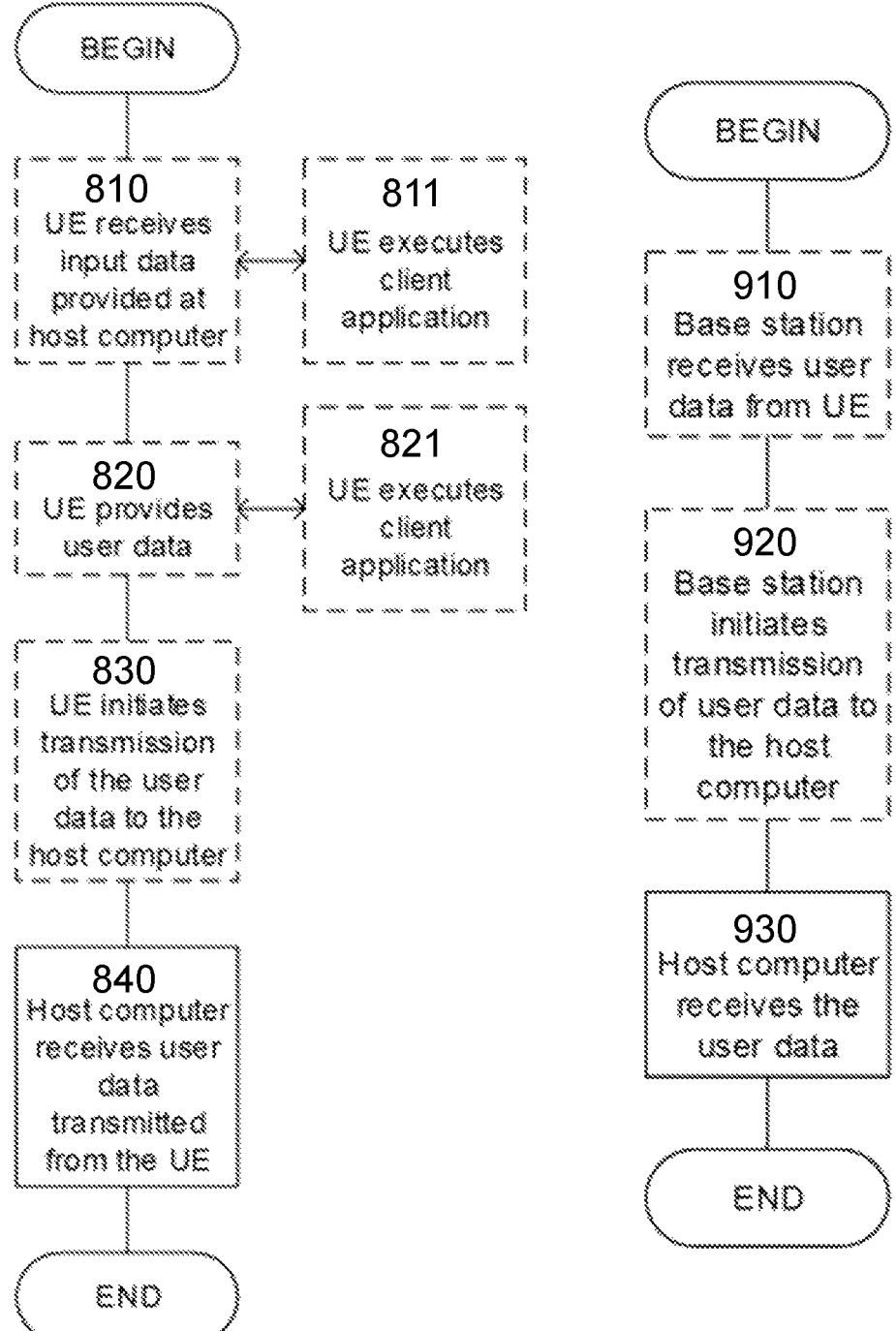
FIG. 16 illustrates another method implemented in a communication system, according to one embodiment.
FIG. 17 illustrates another method implemented in a communication system, according to one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 18:
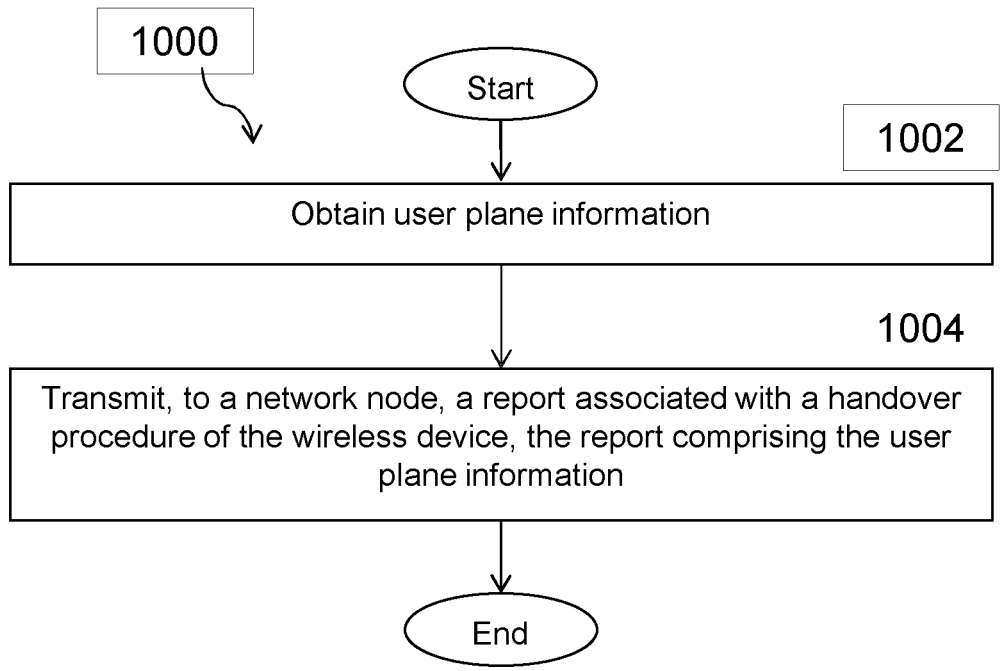
FIG. 18 illustrates an example method by a wireless device, according to certain embodiments.

FIG. 18 depicts a method 1000 by a wireless device 110, according to certain embodiments. At step 1002, the wireless device 110 obtains UP information. At step 1004, the wireless device 110 transmits, to a network node 160, a report associated with a handover procedure of the wireless device 110. The report includes the UP information. The UP information may include any of the information according to any of the embodiments described herein. Alternatively, the UP information may include an UP indicator that indicates that UP information and/or UP data is available according to any of the embodiments described herein.

Figure 19:
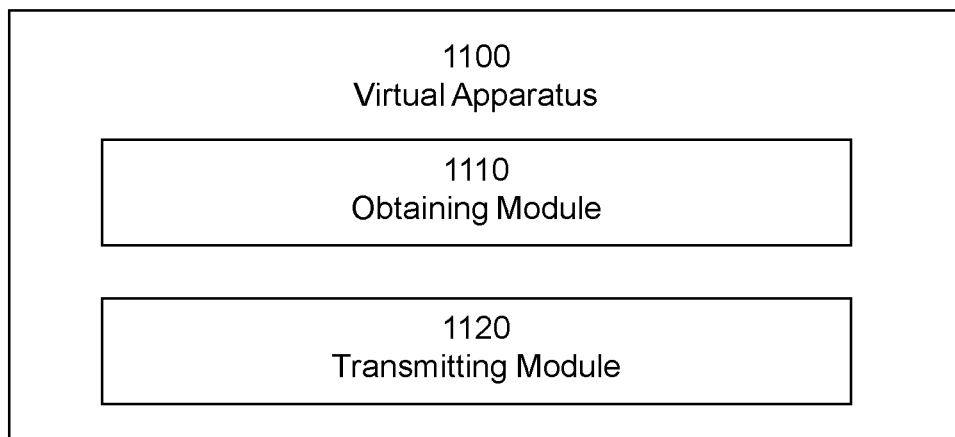
FIG. 19 illustrates an exemplary virtual computing device, according to certain embodiments.

FIG. 19 illustrates a schematic block diagram of a virtual apparatus 1100 in a wireless network (for example, the wireless network shown in FIG. 7). The apparatus may be implemented in a wireless device or network node (e.g., wireless device 110 or network node 160 shown in FIG. 7). Apparatus 1100 is operable to carry out the example method described with reference to FIG. 18 and possibly any other processes or methods disclosed herein. It is also to be understood that the method of FIG. 18 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1110, transmitting module 1120 and any other suitable units of apparatus 1100 to perform corresponding functions according one or more embodiments of the present disclosure.

According to certain embodiments, obtaining module 1110 may perform certain of the obtaining functions of the apparatus 1100. For example obtaining module 1110 may obtaining UP information.

According to certain embodiments, transmitting module 1120 may perform certain of the transmitting functions of the apparatus 1100. For example, transmitting module 1120 may transmit, to a network node 160, a report associated with a handover procedure of the wireless device 110. The report includes the UP information. The UP information may include any of the information according to any of the embodiments described herein. Alternatively, the UP information may include an UP indicator that indicates that UP information and/or UP data is available according to any of the embodiments described herein.

As used herein, the term module may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

Figure 20:
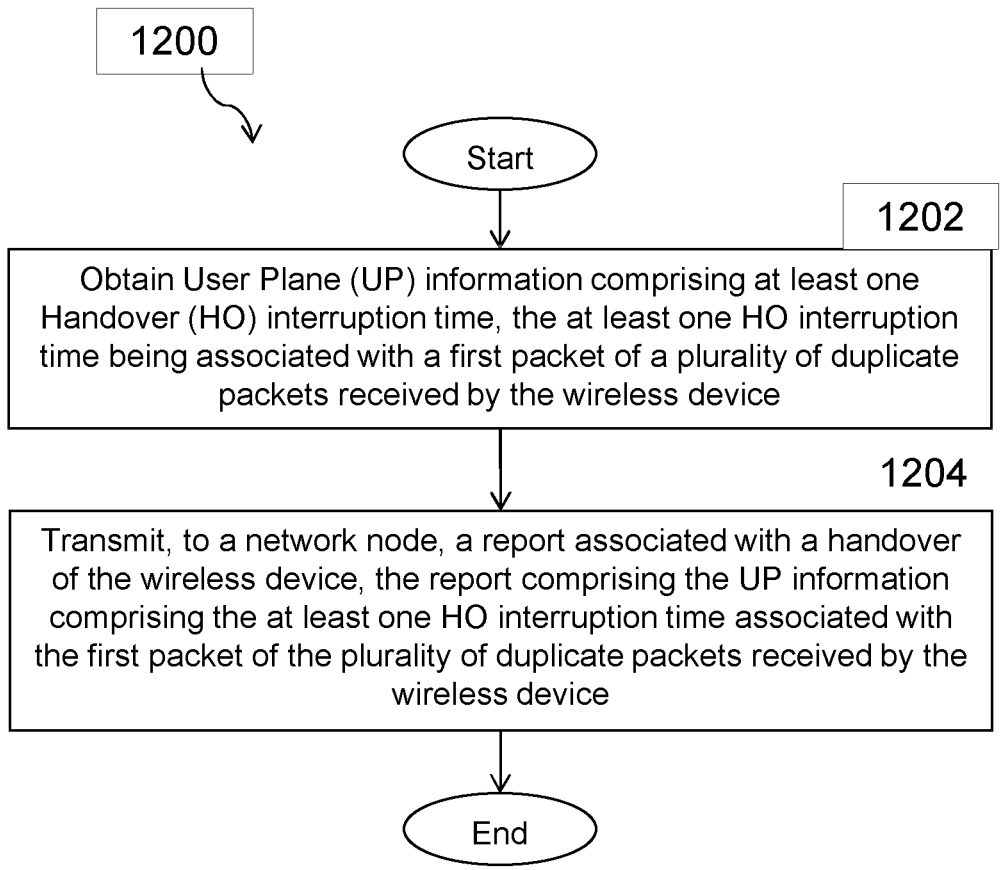
FIG. 20 illustrates another example method by a wireless device, according to certain embodiments.

FIG. 20 depicts another method 1200 by a wireless device 110, according to certain embodiments. At step 1202, the wireless device 110 obtains UP information comprising at least one HO interruption time. The at least one HO interruption time is associated with a first packet of a plurality of duplicate packets received by the wireless device 110. At step 1204, the wireless device 110 transmits, to a network node 160, a report associated with a handover of the wireless device. The report includes the UP information comprising the at least one HO interruption time associated with the first packet of the plurality of duplicate packets received by the wireless device.

In a particular embodiment, the handover comprises a DAPS handover.

In a particular embodiment, the first packet of the plurality packets is received from a first node during the handover of the wireless device, and a second packet of the plurality of packet is received from a second node after the first packet is received. The at least one HO interruption time is calculated based on the first packet from the first node. The at least one HO interruption time is thus calculated based on the first out of a plurality of packets received from the first node and any subsequent packet following the first packet from the first node is thus not considered when calculating the at least one HO interruption time.

In a further particular embodiment, the first packet is received in a first set of packets from the first node and the second packet is received in a second set of packets from the second node.

In a further particular embodiment, the wireless device 110 ignores or not considers the second packet received after the first packet is received when determining the at least one HO interruption time.

In a further particular embodiment, the at least one HO interruption time is determined at a reception of the first packet from the first node.

In a further particular embodiment, the at least one HO interruption time is determined after both a reception of the first packet from the first node and a reception of the second packet from the second node, and the wireless device 110 performs a discard procedure to discard the second packet from the second node.

In a particular embodiment, the at least one HO interruption time comprises an amount of time, T, between a first time associated with a last received non-duplicate packet from a first node to a second time of a first received non-duplicate packet from a second node.

In a particular embodiment, the at least one HO interruption time comprises an amount of time, T, between a first time associated with a last received duplicate packet from a first node to a second time of a first received non-duplicate packet from a second node.

In a particular embodiment, the at least one HO interruption time comprises an amount of time, T, between a first time associated with a last received non-duplicate packet from a first node to a second time of a first received duplicate packet from a second node.

In a particular embodiment, the at least one HO interruption time comprises an amount of time, T, between a first time associated with a last received packet from the first node to a second time of a first received non-duplicate packet from the second node, wherein this HO interruption is computed at reception of the first received non-duplicated packet from the second node.

In a particular embodiment, the UE calculates T as the maximum of the HO interruption times calculated as per any one of the embodiments above related to the HO interruption times.

In a particular embodiment, the at least one HO interruption time comprises an amount of time, T, between a first time associated with a last received packet from the first node to a second time of a first received packet from the second node, irrespective of whether the first received packet from the second node is a duplicate or not, and wherein this HO interruption is computed at reception of the first received packet from the second node.

In a further particular embodiment, the UE receives a first set of packets from a first node and a second set of packet from the second node, the UE applies a duplicate discard procedure to the first set of packets and the second set of packets. The UE then calculates the at least one HO interruption time based on the resulting (non-discarded packets). The at least one HO interruption time comprises an amount of time, T, between the last received and non-discarded packet from the first node to the first subsequently received and non-discarded packet from the second node.

In a further particular embodiment, the at least one HO interruption time is determined at a reception of the first non-duplicate packet form the second node.

In a further particular embodiment, the at least one HO interruption time is determined at the end of the handover procedure.

In a further particular embodiment, the wireless device 110 ignores and/or not considers and/or discards at least one non-duplicate packet received from the first node after reception of the first non-duplicate packet from the second node.

In a further particular embodiment, the UP information comprises at least one timer value associated with the at least one HO interruption time.

In a further particular embodiment, the at least one timer value comprises a time measured from a reception of a handover command by the wireless device 110 until a reception of the last packet from the first node.

In a further particular embodiment, the at least one timer value comprises a time measured from a reception of a handover command by the wireless device until a reception of the first packet from the second node.

In a further particular embodiment, the at least one timer value comprises a time measured from a reception of a handover command by the wireless device 110 until a reception of the first packet from the second node.

In a particular embodiment, the HO interruption time comprises a maximum time duration between a reception of a handover command from a first node and a handover release command from a second node.

In a particular embodiment, the HO interruption time comprises a maximum time duration between a reception of a handover command from a first node and a first non-duplicate packet from a second node.

In a particular embodiment, the handover of the wireless device 110 is from a source node to a target node, and the first node is the target node and the second node comprises the source node.

In a particular embodiment, the handover of the wireless device 110 is from a source node to a target node, and the first node is the source node and the second node comprises the target node.

In a particular embodiment, the first packet and the second packet are associated with a same bearer within a plurality of bearers.

In a particular embodiment, when obtaining the UP information, the wireless device calculates and/or determine the at least one HO interruption time according to any of the embodiments described herein.

In a particular embodiment, when obtaining the UP information, the wireless device 110 logs the at least one HO interruption time during the handover of the wireless device.

In a further particular embodiment, the at least one HO interruption time is logged only if the at least one HO interruption time exceeds or is equal to a threshold value.

In a further particular embodiment, the at least one HO interruption time is logged per DRB.

Figure 21:
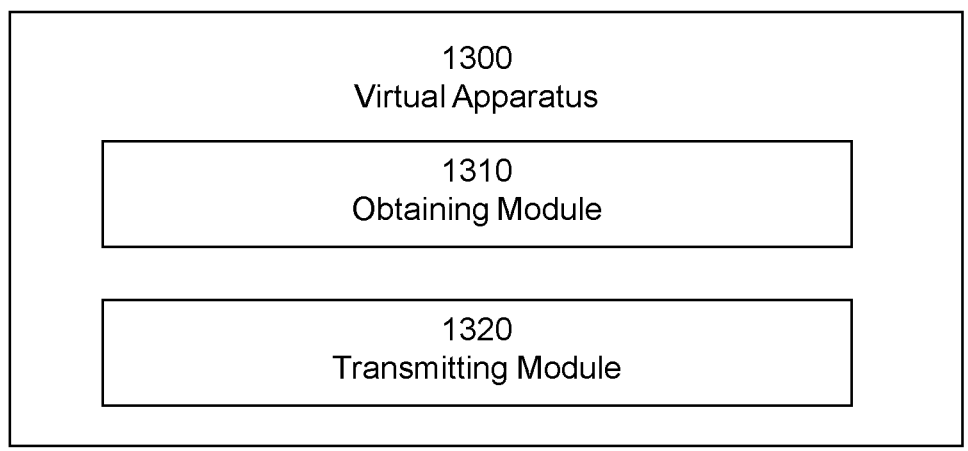
FIG. 21 illustrates another exemplary virtual computing device, according to certain embodiments.

FIG. 21 illustrates a schematic block diagram of a virtual apparatus 1300 in a wireless network (for example, the wireless network shown in FIG. 7). The apparatus may be implemented in a wireless device or network node (e.g., wireless device 110 or network node 160 shown in FIG. 7). Apparatus 1300 is operable to carry out the example method described with reference to FIG. 20 and possibly any other processes or methods disclosed herein. It is also to be understood that the method of FIG. 20 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include SPs), special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1310, transmitting module 1320 and any other suitable units of apparatus 1300 to perform corresponding functions according one or more embodiments of the present disclosure.

According to certain embodiments, obtaining module 1310 may perform certain of the obtaining functions of the apparatus 1300. For example obtaining module 1310 may obtain UP information comprising at least one HO interruption time. The at least one HO interruption time is associated with a first packet of a plurality of duplicate packets received by the wireless device 110.

According to certain embodiments, transmitting 1320 may perform certain of the transmitting functions of the apparatus 1300. For example, transmitting module 1320 may transmit, to a network node 160, a report associated with a handover of the wireless device. The report includes the UP information comprising the at least one HO interruption time associated with the first packet of the plurality of duplicate packets received by the wireless device.

Figure 22:
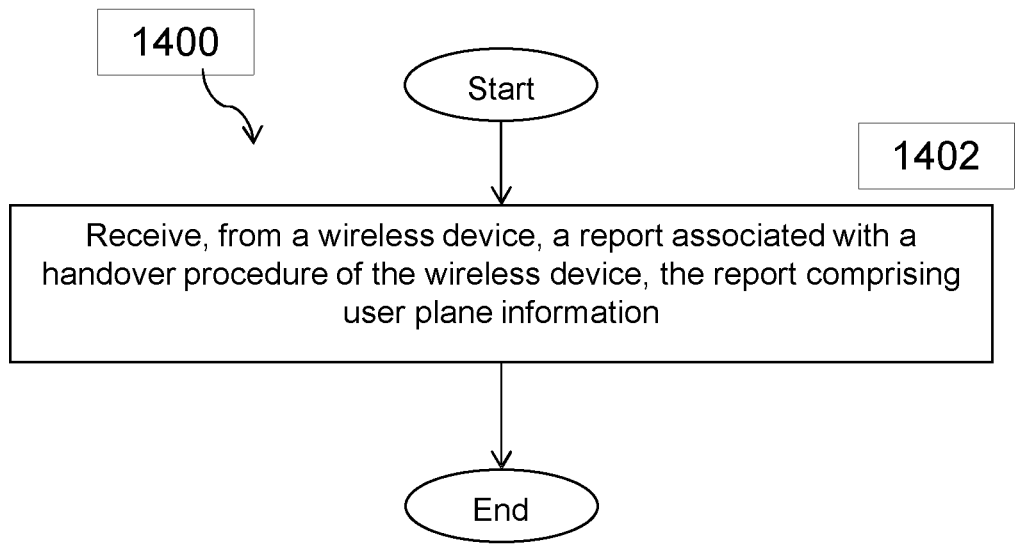
FIG. 22 illustrates an example method by a network node, according to certain embodiments.

FIG. 22 depicts a method 1400 by a network node 160, according to certain embodiments. At step 1402, the network node 160 receives, from a wireless device 110, a report associated with a handover procedure of the wireless device 110. The report comprises UP information. The UP information may include any of the information according to any of the embodiments described herein. Alternatively, the UP information may include an UP indicator that indicates that UP information and/or UP data is available according to any of the embodiments described herein.

Figure 23:
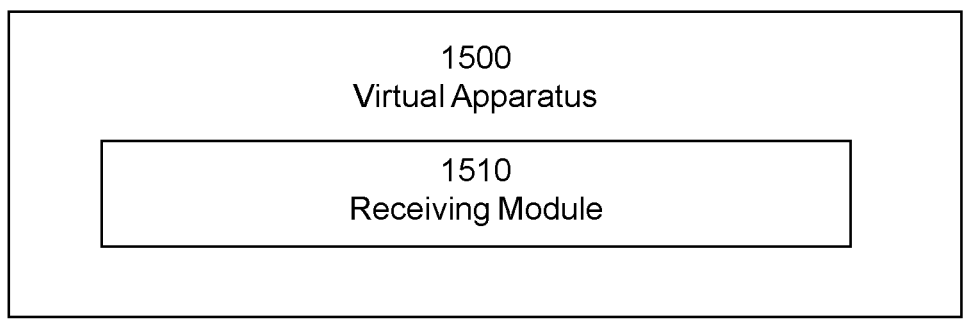
FIG. 23 illustrates another exemplary virtual computing device, according to certain embodiments.

FIG. 23 illustrates a schematic block diagram of a virtual apparatus 1500 in a wireless network (for example, the wireless network shown in FIG. 7). The apparatus may be implemented in a wireless device or network node (e.g., wireless device 110 or network node 160 shown in FIG. 7). Apparatus 1500 is operable to carry out the example method described with reference to FIG. 22 and possibly any other processes or methods disclosed herein. It is also to be understood that the method of FIG. 22 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510 and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, from a wireless device 110, a report associated with a handover procedure of the wireless device 110. The report comprises UP information. The UP information may include any of the information according to any of the embodiments described herein. Alternatively, the UP information may include an UP indicator that indicates that UP information and/or UP data is available according to any of the embodiments described herein.

Figure 24:
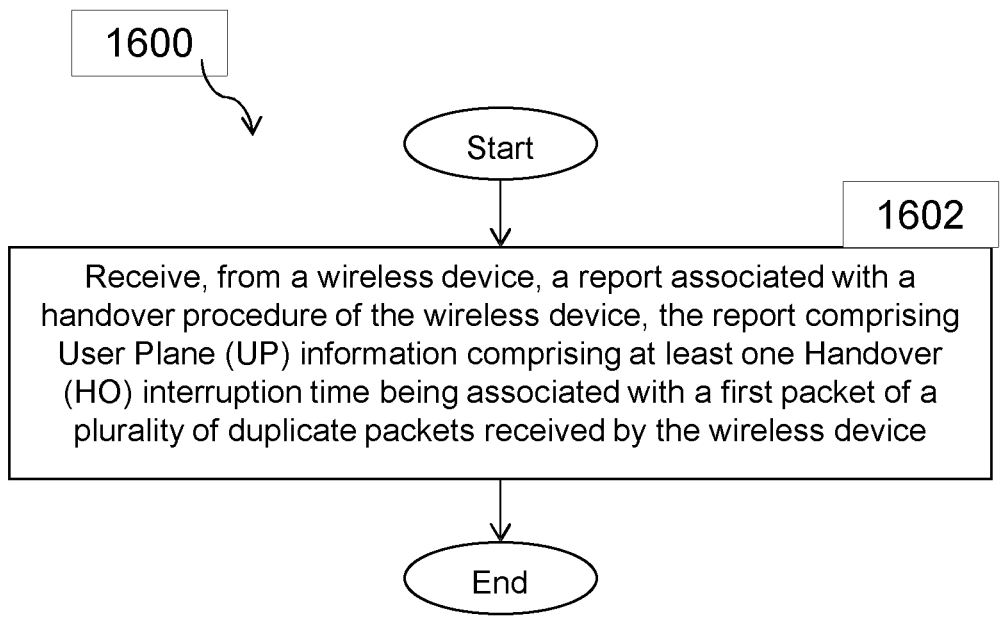
FIG. 24 illustrates another example method by a network node, according to certain embodiments.

FIG. 24 depicts another method 1600 by a network node 160, according to certain embodiments. At step 1602, the network node 160 receives, from a wireless device, a report associated with a handover procedure of the wireless device 110. The report includes UP information comprising at least one HO interruption time being associated with a first packet of a plurality of duplicate packets received by the wireless device 110.

In a particular embodiment, the handover comprises a DAPS handover.

In a particular embodiment, the first packet of the plurality packets is received by the wireless device from a first node during the handover of the wireless device, and a second packet of the plurality of packet is received by the wireless device from a second node after the first packet is received. The at least one HO interruption time is calculated based on the first packet from the first node. The at least one HO interruption time is calculated based on the first out of a plurality of packets received from the first node and any subsequent packet following the first packet from the first node is thus not considered when calculating the at least one HO interruption time.

In a further particular embodiment, the first packet is associated with a first set of packets from the first node and the second packet is associated with a second set of packets from the second node.

In a further particular embodiment, the at least one HO interruption time is not based on the second packet.

In a further particular embodiment, the at least one HO interruption time is associated with a reception time by the wireless device of the first packet from the first node.

In a further particular embodiment, the at least one HO interruption time comprises an amount of time, T, between a first time associated with a last non-duplicate packet received by the wireless device from a first node to a second time of a first non-duplicate packet received by the wireless device from a second node.

In a further particular embodiment, the at least one HO interruption time is determined at a reception of the first non-duplicate packet form the second node.

In a further particular embodiment, the UP information comprises at least one timer value associated with the at least one HO interruption time.

In a further particular embodiment, the at least one timer value comprises a time, T1, measured from a reception of a handover command by the wireless device until a reception of the last packet from the first node.

In a particular embodiment, the at least one timer value comprises a time, T2, measured from a reception of a handover command by the wireless device until a reception of the first packet from the second node.

In a particular embodiment, the wireless device 110 estimates a time between a reception by the wireless device of the last non-duplicated packet from the first node and a reception by the wireless device of the first non-duplicated packet from the second node based on the at least one timer value.

In a further particular embodiment, the wireless device 110 estimates a time between the reception by the wireless device 110 of the last non-duplicated packet from the first node and the reception by the wireless device 110 of the first non-duplicated packet from the second node comprises computing T2-T1.

In a particular embodiment, the at least one timer value comprises a time measured from a reception of a handover command by the wireless device until a reception of the first packet from the second node.

In a particular embodiment, the HO interruption time comprises a maximum time duration between a reception of a handover command from a first node and a handover release command from a second node.

In a particular embodiment, the HO interruption time comprises a maximum time duration between a reception of a handover command from a first node and a first non-duplicate packet from a second node.

In a particular embodiment, the handover of the wireless device 110 is from a source node to a target node, and the first node comprises the target node and the second node comprises the source node.

In a particular embodiment, the handover of the wireless device 110 is from a source node to a target node, and the first node comprises the source node and the second node comprises the target node.

In a particular embodiment, the first packet and the second packet are associated with a same bearer within a plurality of bearers.

In a particular embodiment, the UP information comprises at least one HO interruption time logged during the handover of the wireless device 110.

In a particular embodiment, the at least one HO interruption time is logged only if the at least one HO interruption time exceeds or is equal to a threshold value.

In a particular embodiment, the at least one HO interruption time is logged per DRB.

Figure 25:
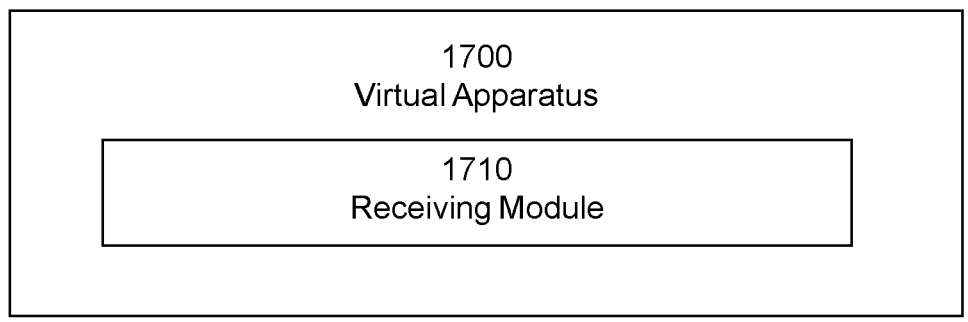
FIG. 25 illustrates another exemplary virtual computing device, according to certain embodiments.

FIG. 25 illustrates a schematic block diagram of a virtual apparatus 1700 in a wireless network (for example, the wireless network shown in FIG. 7). The apparatus may be implemented in a wireless device or network node (e.g., wireless device 110 or network node 160 shown in FIG. 7). Apparatus 1700 is operable to carry out the example method described with reference to FIG. 24 and possibly any other processes or methods disclosed herein. It is also to be understood that the method of FIG. 24 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include SPs), special-purpose digital logic, and the like. The processing circuitry may be configured to execute program code stored in memory, which may include one or several types of memory such as ROM, random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1710 module and any other suitable units of apparatus 1700 to perform corresponding functions according one or more embodiments of the present disclosure.

According to certain embodiments, receiving module 1710 may perform certain of the receiving functions of the apparatus 1700. For example receiving module 1710 may receive, from a wireless device 110, a report associated with a handover procedure of the wireless device 110. The report includes UP information comprising at least one HO interruption time being associated with a first packet of a plurality of duplicate packets received by the wireless device 110.

Example Embodiments

Example Embodiment 1. A wireless device comprising: processing circuitry configured to perform any of the steps of any of the wireless device embodiments; and power supply circuitry configured to supply power to the wireless device.

Example Embodiment 2. A network node comprising: processing circuitry configured to perform any of the steps of any of the network node embodiments; power supply circuitry configured to supply power to the wireless device.

Example Embodiment 3. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the wireless device embodiments; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 4. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of the network node embodiments.

Example Embodiment 5. The communication system of the previous embodiment further including the network node.

Example Embodiment 6. The communication system of the previous 2 embodiments, further including the wireless device, wherein the wireless device is configured to communicate with the network node.

Example Embodiment 7. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 8. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of the network node embodiments.

Example Embodiment 9. The method of the previous embodiment, further comprising, at the network node, transmitting the user data.

Example Embodiment 10. The method of the previous 2 embodiments, wherein the user data is provided at the host computer by executing a host application, the method further comprising, at the wireless device, executing a client application associated with the host application.

Example Embodiment 11. A wireless device configured to communicate with a network node, the wireless device comprising a radio interface and processing circuitry configured to performs the of the previous 3 embodiments.

Example Embodiment 12. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of the Group Example Embodiments.

Example Embodiment 13. The communication system of the previous embodiment, wherein the cellular network further includes a network node configured to communicate with the wireless device.

Example Embodiment 14. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 15. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of the wireless device embodiments.

Example Embodiment 16. The method of the previous embodiment, further comprising at the wireless device, receiving the user data from the network node.

Example Embodiment 17. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of the wireless device embodiments.

Example Embodiment 18. The communication system of the previous embodiment, further including the wireless device.

Example Embodiment 19. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 20. The communication system of the previous 3 embodiments, wherein: the processing circuitry of the host computer is configured to execute a host application; and the wireless device's processing circuitry is configured to execute a client application associated with the host application, thereby providing the user data.

Example Embodiment 21. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 22. A method implemented in a communication system including a host computer, a network node and a wireless device, the method comprising: at the host computer, receiving user data transmitted to the network node from the wireless device, wherein the wireless device performs any of the steps of any of the wireless device embodiments.

Example Embodiment 23. The method of the previous embodiment, further comprising, at the wireless device, providing the user data to the network node.

Example Embodiment 24. The method of the previous 2 embodiments, further comprising: at the wireless device, executing a client application, thereby providing the user data to be transmitted; and at the host computer, executing a host application associated with the client application.

Example Embodiment 25. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 26. A communication system including a host computer comprising a communication interface configured to receive user data originating from a transmission from a wireless device to a network node, wherein the network node comprises a radio interface and processing circuitry, the network node's processing circuitry configured to perform any of the steps of any of the network node embodiments.

Example Embodiment 27. The communication system of the previous embodiment further including the network node.

Example Embodiment 28. The communication system of the previous 2 embodiments, further including the wireless device, wherein the wireless device is configured to communicate with the network node.

Example Embodiment 29. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 30. A method implemented in a communication system including a host computer, a network node and a wireless device, the method comprising: at the host computer, receiving, from the base station, user data originating from a transmission which the network node has received from the wireless device, wherein the wireless device performs any of the steps of any of the Group A Example Embodiments.

Example Embodiment 31. The method of the previous embodiment, further comprising at the network node receiving the user data from the wireless device.

Example Embodiment 32. The method of the previous 2 embodiments, further comprising at the network node, initiating a transmission of the received user data to the host computer.

Example Embodiment 33. The method of any of the previous embodiments, wherein the network node comprises a base station.

Example Embodiment 34. The method of any of the previous embodiments, wherein the wireless device comprises a user equipment (UE).

Example Embodiment 35. A computer program comprising instructions which when executed on a computer perform any of the methods and steps of described herein.

Example Embodiment 36. A computer program product comprising computer program, the computer program comprising instructions which when executed on a computer perform any of the methods and steps of described herein.

Example Embodiment 37. A non-transitory computer readable medium storing instructions which when executed by a computer perform any of the methods and steps of described herein.

Example Embodiment 38. A wireless device comprising processing circuitry configured to perform any of the methods and steps of described herein.

Example Embodiment 39. A network node comprising processing circuitry configured to perform any of the methods and steps of described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device, the method comprising:

obtaining User Plane, UP, information comprising at least one Handover, HO, interruption time, the at least one HO interruption time comprises an amount of time, T, between a first time associated with a last received non-duplicate packet from a first node to a second time of a first received non-duplicate packet from a second node; and transmitting, to a network node, a report associated with a handover of the wireless device, the report comprising the UP information comprising the at least one HO interruption time.

2. The method of claim 1, wherein the handover comprises a dual active protocol stack (DAPS) handover.

3. The method of claim 1, wherein the at least one HO interruption time is determined at a reception of the first non-duplicate packet from the second node.

4. The method of claim 3, further comprising ignoring/not considering at least one packet received from the first node after reception of the first non-duplicate packet from the second node.

5. The method of claim 1, wherein the UP information comprises at least one timer value associated with the at least one HO interruption time.

6. The method of claim 5, wherein the at least one timer value comprises a time measured from a reception of a handover command by the wireless device until a reception of the last packet from the first node.

7. The method of claim 5, wherein the at least one timer value comprises a time measured from a reception of a handover command by the wireless device until a reception of the first packet from the second node.

8. The method of claim 1, wherein the handover of the wireless device is from a source node to a target node, and wherein the first node comprises the target node and the second node comprises the source node.

9. The method of claim 1, wherein the handover of the wireless device is from a source node to a target node, and wherein the first node comprises the source node and the second node comprises the target node.

10. The method of claim 1, wherein the first packet and the second packet are associated with a same bearer within a plurality of bearers.

11. The method of claim 1, wherein obtaining the UP information comprises logging the at least one HO interruption time during the handover of the wireless device.

12. The method of claim 11, wherein the at least one HO interruption time is logged only if the at least one HO interruption time exceeds or is equal to a threshold value.

13. The method of claim 11, wherein the at least one HO interruption time is logged per DRB.

14. A method performed by a network node, the method comprising:

receiving, from a wireless device, a report associated with a handover procedure of the wireless device, the report comprising User Plane, UP, information comprising at least one Handover, HO, interruption time wherein the at least one HO interruption time comprises an amount of time, T, between a first time associated with a last non-duplicate packet received by the wireless device from a first node to a second time of a first non-duplicate packet received by the wireless device from a second node.

15. The method of claim 14, wherein the handover comprises a dual active protocol stack, DAPS, handover.

16. The method of claim 14, wherein the UP information comprises at least one timer value associated with the at least one HO interruption time.

17. The method of claim 14, wherein the first packet and the second packet are associated with a same bearer within a plurality of bearers.

18. A wireless device adapted to:

obtain User Plane, UP, information comprising at least one Handover, HO, interruption time, the at least one HO interruption time comprises an amount of time, T, between a first time associated with a last received non-duplicate packet from a first node to a second time of a first received non-duplicate packet from a second node; and transmit, to a network node, a report associated with a handover of the wireless device, the report comprising the UP information comprising the at least one HO interruption time.

19. The wireless device of claim 18, wherein the handover comprises a dual active protocol stack (DAPS) handover.

20. A network node adapted to:

receive, from a wireless device, a report associated with a handover procedure of the wireless device, the report comprising User Plane, UP, information comprising at least one Handover, HO, interruption time wherein the at least one HO interruption time comprises an amount of time, T, between a first time associated with a last non-duplicate packet received by the wireless device from a first node to a second time of a first non-duplicate packet received by the wireless device from a second node.

21. The network node of claim 20, wherein the handover comprises a dual active protocol stack, DAPS, handover.

* * * * *